(12) United States Patent
Hanamitsu et al.

(10) Patent No.: US 10,786,717 B2
(45) Date of Patent: Sep. 29, 2020

(54) IMPACT POINT ESTIMATION APPARATUS

(71) Applicants: DUNLOP SPORTS CO. LTD., Kobe-shi, Hyogo (JP); SUMITOMO RUBBER INDUSTRIES, LTD., Kobe-shi, Hyogo (JP)

(72) Inventors: Satoru Hanamitsu, Kobe (JP); Masahiko Ueda, Kobe (JP); Kousuke Okazaki, Kobe (JP); Yuto Nakamura, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 5 days.

(21) Appl. No.: 15/603,849

(22) Filed: May 24, 2017

(65) Prior Publication Data

US 2017/0340936 A1 Nov. 30, 2017

(30) Foreign Application Priority Data

May 31, 2016 (JP) .................................. 2016-108500

(51) Int. Cl.
*A63B 57/00* (2015.01)
*A63B 60/46* (2015.01)
(Continued)

(52) U.S. Cl.
CPC .............. *A63B 60/46* (2015.10); *A63B 69/36* (2013.01); *A63B 71/0622* (2013.01); *G01B 5/0023* (2013.01); *A63B 2102/32* (2015.10); *A63B 2220/34* (2013.01); *A63B 2220/40* (2013.01); *A63B 2220/62* (2013.01); *A63B 2225/50* (2013.01)

(58) Field of Classification Search
CPC .......... A63B 69/3617; A63B 2069/362; A63B 69/36; A63B 60/46
USPC ........................................................ 473/223
See application file for complete search history.

(56) References Cited

U.S. PATENT DOCUMENTS 4,991,850 A 2/1991 Wilhlem
9,551,572 B2 * 1/2017 Yamashita ............. A63B 69/36
(Continued)

FOREIGN PATENT DOCUMENTS

JP 2006-247023 A 9/2006
JP 2007-61606 A 3/2007
(Continued)

OTHER PUBLICATIONS

Japanese Office Action for Japanese Application No. 2016-108500, dated Jan. 28, 2020, with English translation.

*Primary Examiner* — Raeann Gorden
(74) *Attorney, Agent, or Firm* — Birch, Stewart, Kolasch & Birch, LLP

(57) ABSTRACT

Provided is an impact point estimation apparatus that is capable of estimating, easily and with high accuracy, an impact point on a face surface of a golf club head at the time of a golf swing. The impact point estimation apparatus includes an acquisition part configured to acquire time-series sensor data that is output from at least one of an angular velocity sensor and an acceleration sensor attached to at least one of a grip and a shaft of a golf club and an estimation part configured to estimate the impact point, according to a shaft characteristic which is a characteristic of the shaft, based on the sensor data.

13 Claims, 17 Drawing Sheets

(51) Int. Cl.
*G01B 5/00* (2006.01)
*A63B 69/36* (2006.01)
*A63B 71/06* (2006.01)
*A63B 102/32* (2015.01)

(56) References Cited

U.S. PATENT DOCUMENTS

| | | | |
|---|---|---|---|
| 9,821,209 B2 * | 11/2017 | Ueda | A63B 69/36 |
| 2003/0032494 A1 | 2/2003 | McGinty et al. | |
| 2005/0032582 A1 * | 2/2005 | Mahajan | A63B 69/00 473/222 |
| 2007/0049393 A1 | 3/2007 | Gobush | |
| 2008/0220891 A1 | 9/2008 | Gobush et al. | |
| 2010/0304877 A1 | 12/2010 | Iwahashi et al. | |
| 2011/0021280 A1 | 1/2011 | Boroda et al. | |
| 2014/0278207 A1 * | 9/2014 | Hadden | G09B 19/0038 702/141 |
| 2014/0290332 A1 | 10/2014 | Yamashita et al. | |
| 2015/0238813 A1 * | 8/2015 | Saiki | G06K 9/00342 702/141 |
| 2017/0082427 A1 | 3/2017 | Yamashita et al. | |
| 2017/0312573 A1 * | 11/2017 | Thornton | A63B 69/36 |

FOREIGN PATENT DOCUMENTS

| | | |
|---|---|---|
| JP | 2013-165808 A | 8/2013 |
| WO | WO 2006/090638 A1 | 8/2006 |
| WO | WO 2009/069698 A1 | 6/2009 |
| WO | WO 2013-069447 A1 | 5/2013 |
| WO | WO 2014/144102 A1 | 9/2014 |

* cited by examiner

IMPACT POINT ESTIMATION APPARATUS

CROSS REFERENCE TO RELATED APPLICATION

This application claims a priority to Japanese Patent Application No. 2016-108500 filed on May 31, 2016, which is hereby incorporated by reference in its entirety.

The present invention relates to an impact point estimation apparatus, method and program that estimate an impact point on the face surface of a golf club head at which impact occurs when a golf club is swung and hits a golf ball.

Heretofore, technologies for estimating the impact point on the face surface of a golf club head at which impact occurs at the time of a golf swing have been proposed. For example, WO 2009-069698A1 (hereinafter called "Patent Literature 1") discloses an apparatus that requires attaching a plurality of sensors for detecting vibrations produced at the time of impact to the back of the face surface, and that estimates the impact point from the output signals of these sensors.

SUMMARY OF INVENTION

However, with the method of Patent Literature 1, the sensors are attached to the head, or more specifically, to the back side of the face surface, and thus attaching the sensors can be difficult. Also, in the case where sensors are attached to the head, the existence of the sensors can interfere with the golfer's natural golf swing.

An object of the present invention is to provide an impact point estimation apparatus, method and program that are capable of estimating, easily and with high accuracy, the impact point on the face surface of a golf club head at which impact occurs at the time of a golf swing.

An impact point estimation apparatus according to a first aspect of the present invention is an impact point estimation apparatus that estimates, when a golf club having a grip, a shaft and a head is swung and hits a golf ball, an impact point on a face surface of the head, and includes an acquisition part and an estimation part. The acquisition part acquires time-series sensor data that is output from at least one of an angular velocity sensor and an acceleration sensor attached to at least one of the grip and the shaft. The estimation part estimates the impact point, according to a shaft characteristic which is a characteristic of the shaft, based on the sensor data.

An impact point estimation apparatus according to a second aspect of the present invention is the impact point estimation apparatus according to the first aspect, in which the estimation part derives an indicator that is dependent on the impact point from the sensor data, according to the shaft characteristic, and estimates the impact point, according to the indicator.

An impact point estimation apparatus according to a third aspect of the present invention is the impact point estimation apparatus according to the second aspect, in which the estimation part determines a specific frequency, according to the shaft characteristic, derives, as the indicator, a phase angle corresponding to the specific frequency of a spectrum of an angular velocity about an axis in a toe-heel direction or in a direction roughly parallel to the toe-heel direction, or a phase angle corresponding to the specific frequency of a spectrum of an acceleration in a face-back direction or a direction roughly parallel to the face-back direction, and estimates a position of the impact point in an up-down direction, according to the phase angle.

An impact point estimation apparatus according to a fourth aspect of the present invention is the impact point estimation apparatus according to any of the first aspect to the third aspect, in which the shaft characteristic is flex.

An impact point estimation apparatus according to a fifth aspect of the present invention is the impact point estimation apparatus according to the first aspect, in which the estimation part derives an indicator that is dependent on the impact point from the sensor data, and estimates the impact point, according to the indicator and the shaft characteristic.

An impact point estimation apparatus according to a sixth aspect of the present invention is the impact point estimation apparatus according to the fifth aspect, in which the estimation part estimates the impact point by selecting a specific regression equation, according to the shaft characteristic, from among a plurality of regression equations in which the indicator is an explanatory variable and the impact point is an objective variable, and substituting the indicator derived from the sensor data into the specific regression equation.

An impact point estimation apparatus according to a seventh aspect of the present invention is the impact point estimation apparatus according to the fifth aspect or the sixth aspect, in which the shaft characteristic is at least one of flex, torque, kick point, and weight.

An impact point estimation apparatus according to an eighth aspect of the present invention is an impact point estimation apparatus that estimates, when a golf club having a grip, a shaft and a head is swung and hits a golf ball, an impact point on a face surface of the head, and includes an acquisition part and an estimation part. The acquisition part acquires time-series sensor data that is output from at least one of an angular velocity sensor and an acceleration sensor attached to at least one of the grip and the shaft. The estimation part estimates the impact point, based on the sensor data. The estimation part determines whether the impact point exists on the face surface in a vicinity of a principal axis of inertia, based on the sensor data.

An impact point estimation apparatus according to a ninth aspect of the present invention is the impact point estimation apparatus according to the eighth aspect, in which the estimation part derives an indicator that is dependent on the impact point from the sensor data, and determines whether the impact point exists on the face surface in a vicinity of the principal axis of inertia, according to the indicator.

An impact point estimation apparatus according to a tenth aspect of the present invention is the impact point estimation apparatus according to the ninth aspect, in which the estimation part derives, as the indicator, a magnitude of a spectrum corresponding to a predetermined mode or a predetermined frequency of an angular velocity about an axis in a toe-heel direction or in a direction that is roughly parallel to the toe-heel direction, or a magnitude of a spectrum corresponding to a predetermined mode or a predetermined frequency of an acceleration in a face-back direction or in a direction roughly parallel to the face-back direction, and determines whether the impact point exists on the face surface in a vicinity of the principal axis of inertia, according to the magnitude of the spectrum.

An impact point estimation apparatus according to an eleventh aspect of the present invention is an impact point estimation apparatus that estimates, when a golf club having a grip, a shaft and a head is swung and hits a golf ball, an impact point on a face surface of the head, and includes an acquisition part and an estimation part. The acquisition part acquires time-series sensor data that is output from at least one of an angular velocity sensor and an acceleration sensor attached to at least one of the grip and the shaft. The estimation part estimates the impact point, based on the sensor data. The estimation part classifies the impact point into one of a plurality of regions defined on the face surface, according to a first indicator that is derived from the sensor data, and, in a case where a second indicator that is derived from the sensor data exceeds a threshold, reclassifies the impact point into another region included among the plurality of regions.

An impact point estimation program according to a twelfth aspect of the present invention is an impact point estimation program that estimates, when a golf club having a grip, a shaft and a head is swung and hits a golf ball, an impact point on a face surface of the head, and causes a computer to execute the following steps.

(1) A step of acquiring time-series sensor data that is output from at least one of an angular velocity sensor and an acceleration sensor attached to at least one of the grip and the shaft.

(2) A step of estimating the impact point, according to a shaft characteristic which is a characteristic of the shaft, based on the sensor data.

An impact point estimation program according to a thirteenth aspect of the present invention is an impact point estimation program that estimates, when a golf club having a grip, a shaft and a head is swung and hits a golf ball, an impact point on a face surface of the head, and causes a computer to execute the following steps.

(1) A step of acquiring time-series sensor data that is output from at least one of an angular velocity sensor and an acceleration sensor attached to at least one of the grip and the shaft.

(2) A step of estimating the impact point, based on the sensor data.

Also, the (2) step includes the step of determining whether the impact point exists on the face surface in a vicinity of a principal axis of inertia, based on the sensor data.

An impact point estimation program according to a fourteenth aspect of the present invention is an impact point estimation program that estimates, when a golf club having a grip, a shaft and a head is swung and hits a golf ball, an impact point on a face surface of the head, and causes a computer to execute the following steps.

(1) A step of acquiring time-series sensor data that is output from at least one of an angular velocity sensor and an acceleration sensor attached to at least one of the grip and the shaft.

(2) A step of estimating the impact point, based on the sensor data.

Also, the (2) step includes the step of classifying the impact point into one of a plurality of regions defined on the face surface, according to a first indicator that is derived from the sensor data, and, in a case where a second indicator that is derived from the sensor data exceeds a threshold, reclassifying the impact point into another region included among the plurality of regions.

According to the present invention, the impact point on the face surface of a golf club head is estimated, based on time-series sensor data output from at least one of an angular velocity sensor and an acceleration sensor attached to at least one of the grip and the shaft of the golf club. Accordingly, not only does it become comparatively easy to attach the sensors but the existence of the sensors tends not to interfere with the golf swing. As a result, the impact point at the time of a golf swing can be estimated easily and with high accuracy.

Also, the influence of hitting the golf ball on the face surface will be transmitted from the head through the shaft to the sensor attached to at least one of the grip and the shaft. Accordingly, the waveform of the sensor data that is output from the sensor tends to be affected by the characteristics of the shaft. In this regard, according to the first aspect and the twelfth aspect, the impact point is estimated according to the characteristics of the shaft, thus enabling the impact point to be estimated with high accuracy.

Also, in the case where the face surface hits the golf ball in a vicinity of the principal axis of inertia of the head, the head tends not to rotate, and this can result in different tendencies from when other places on the face surface hit the ball appearing in the waveform of the sensor data at this time. For example, a high frequency component tends not to appear in the sensor data when the face surface hits the ball in a vicinity of the principal axis of inertia of the head. In this regard, according to the eighth aspect and the thirteenth aspect, it is determined, based on the sensor data, whether the impact point exists in a vicinity of the principal axis of inertia of the head on the face surface. Accordingly, the impact point can be estimated with high accuracy.

Also, according to the eleventh aspect and the fourteenth aspect, the impact point is classified into one of a plurality of regions that are defined on the face surface, according to a first indicator that is derived from the sensor data. Also, the impact point is reclassified into another region that is included in the plurality of regions, in the case where a second indicator that is derived from the sensor data exceeds a threshold. Accordingly, the impact point can be estimated with high accuracy from various viewpoints.

DETAILED DESCRIPTION OF THE PREFERRED EMBODIMENTS

Hereinafter, an impact point estimation apparatus, method and program according to one embodiment of the present invention will be described, with reference to the drawings.

1. Schematic Configuration of Swing Analysis System

Figure 1:
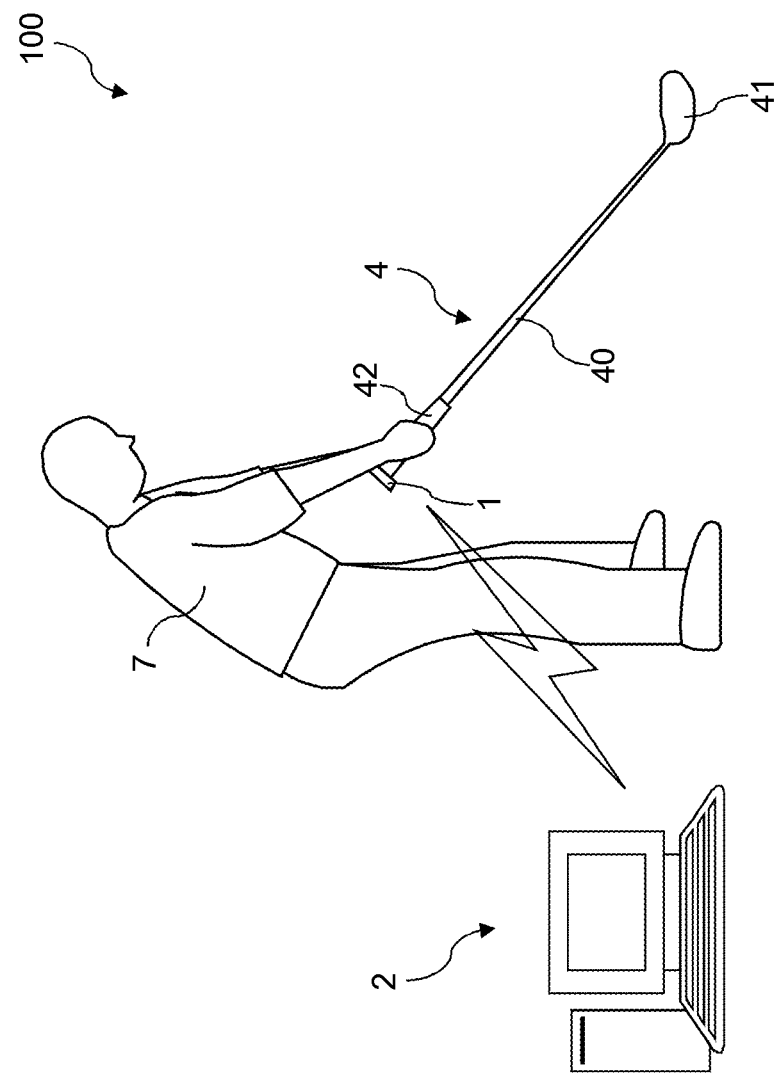
FIG. 1 is a diagram showing a swing analysis system that is provided with an impact point estimation apparatus according to one embodiment of the present invention.
Figure 2:
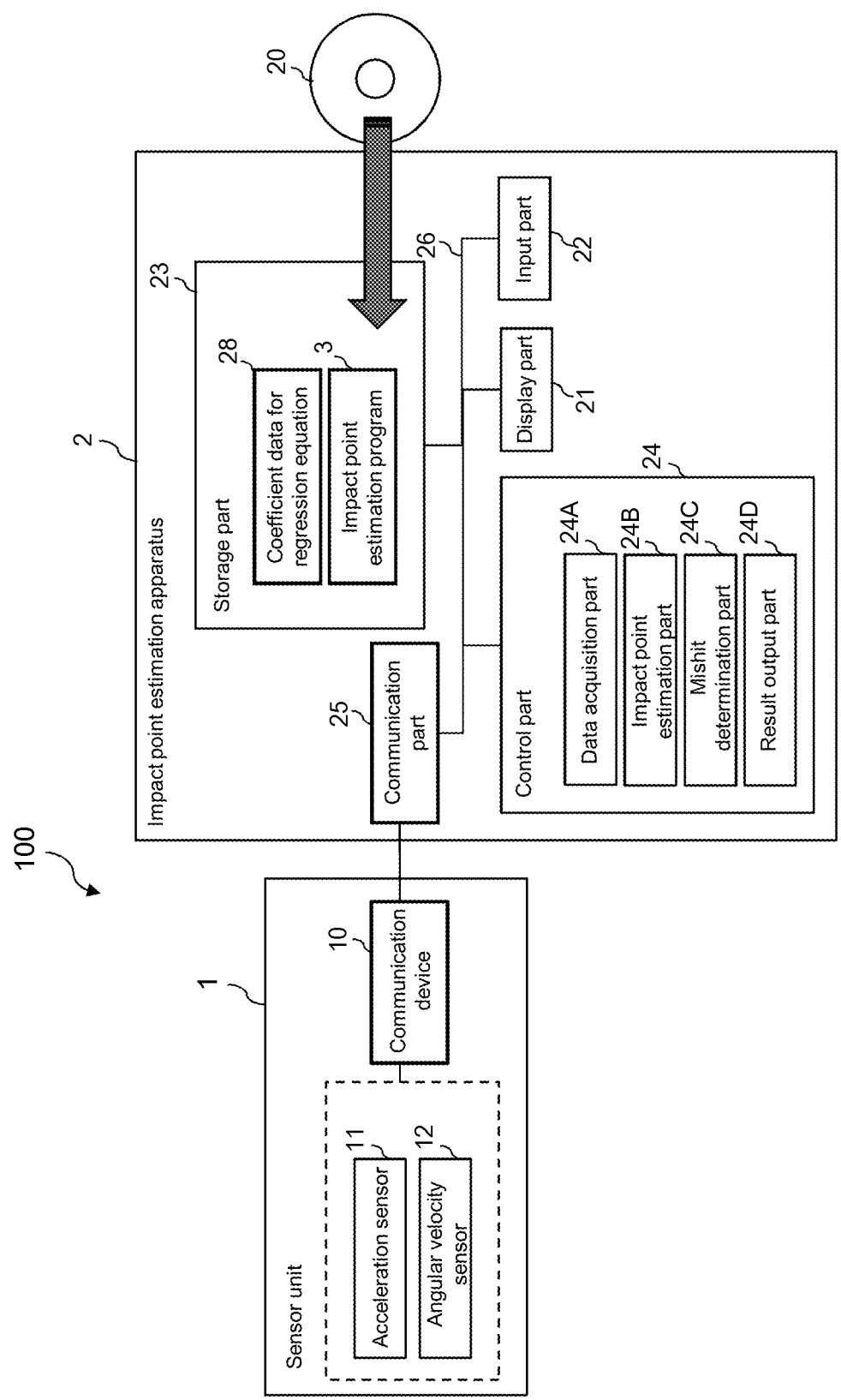
FIG. 2 is a functional block diagram of the swing analysis system of FIG. 1.

The overall configuration of a swing analysis system 100 that is provided with an impact point estimation apparatus 2 according to the present embodiment is shown in FIGS. 1 and 2. The swing analysis system 100 is a system that analyzes the golf swing of a golfer 7 who used a golf club 4. The impact point estimation apparatus 2 is equipped with a function of estimating the impact point (strike position) on a face surface 41a (see FIG. 6) of a head 41 at which impact with a golf ball occurs when the golfer 7 swings the golf club 4 and hits the golf ball. Information on the impact point estimated by the impact point estimation apparatus 2 can be used, for example, in grasping how often the golfer 7 is hitting the ball in the sweet area during golf practice. Alternatively, this information can also be used to help with fitting the golf club 4. Collection of data to be analyzed is performed by a sensor unit 1 attached to a grip 42 of the golf club 4, and this sensor unit 1 constitutes the swing analysis system 100 together with the impact point estimation apparatus 2.

Hereinafter, the configuration of the sensor unit 1 and the impact point estimation apparatus 2 will be described, followed by description of the flow of impact point estimation processing.

1-1. Configuration of Sensor Unit

Figure 3:
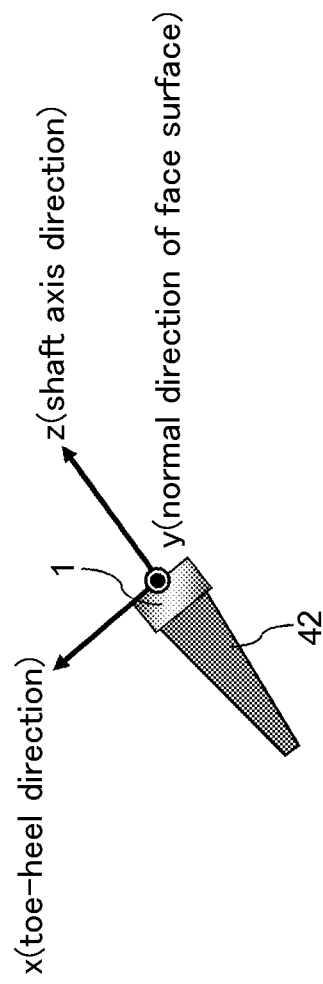
FIG. 3 is a diagram illustrating an xyz local coordinate system that is centered on a grip of a golf club.

The sensor unit 1 is attached to an end portion of the grip 42 of the golf club 4 on the opposite side to the head 41, as shown in FIGS. 1 and 3, and measures the behavior of the grip 42. Note that the golf club 4 is a common golf club, and is constituted by a shaft 40, the head 41 provided at one end of the shaft 40, and the grip 42 provided at the other end of the shaft 40. The sensor unit 1 is constituted to be compact and lightweight, so as to not interfere with the swing motion. The sensor unit 1 can be attached to the outer side of the golf club 4, and can be constituted to be freely removed from the golf club 4.

As shown in FIG. 2, the sensor unit 1 is equipped with an acceleration sensor 11 and an angular velocity sensor 12. Also, the sensor unit 1 is also equipped with a communication device 10 for transmitting sensor data that is output from these sensors 11 and 12 to the external impact point estimation apparatus 2. Note that, in the present embodiment, the communication device 10 is a wireless communication device so as to not interfere with the swing motion, but may be configured as a wired communication device that connects to the impact point estimation apparatus 2 via a cable.

The acceleration sensor 11 and the angular velocity sensor 12 respectively measure acceleration and angular velocity in an xyz local coordinate system. More specifically, the acceleration sensor 11 measures accelerations $a_x$, $a_y$ and $a_z$ of the grip 42 in x-axis, y-axis and z-axis directions. The angular velocity sensor 12 measures angular velocities $\omega_x$, $\omega_y$ and $\omega_z$ of the grip 42 about the x-axis, y-axis and z-axis. The sensor data thereof is acquired as time-series data of a predetermined sampling period $\Delta t$. Note that the xyz local coordinate system is 3-axis orthogonal coordinate system that is defined as shown in FIG. 3. That is, the z-axis coincides with the direction in which the shaft 40 extends, and the direction toward the grip 42 from the head 41 is a z-axis positive direction. The y-axis is oriented so as to be aligned as closely as possible with the ball flight direction at the time of address of the golf club 4, that is, so as to be roughly aligned with a face-back direction, and the direction toward the face side from the back side is a y-axis positive direction. The x-axis is oriented so as to be orthogonal to the y-axis and the z-axis, that is, so as to be roughly aligned with a toe-heel direction, and the direction toward the toe side from the heel side is an x-axis positive direction. Accordingly, the x-axis and the z-axis are contained in a plane that is roughly parallel to the face surface 41a.

Figure 4:
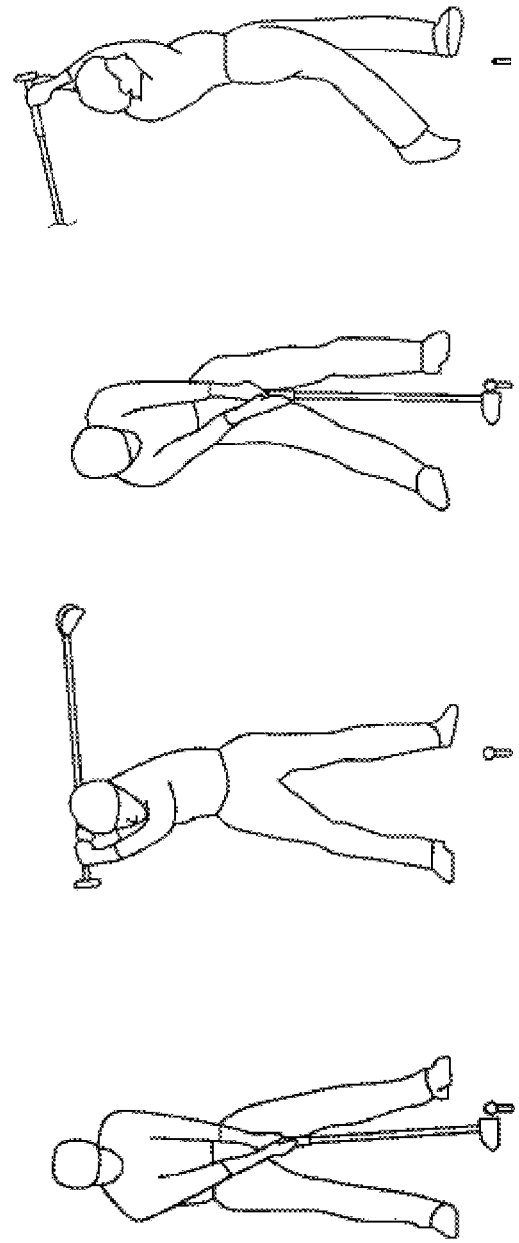
FIG. 4A is a diagram showing an address state.
FIG. 4B is a diagram showing a top state.
FIG. 4C is a diagram showing an impact state.
FIG. 4D is a diagram showing a finish state.

Note that the swing motion of a golf club generally progresses in order of address, top, impact and finish. Address indicates an initial state in which the head 41 of the golf club 4 is disposed near the ball, as shown in FIG. 4A, and top indicates a state in which the head 41 is swung up to the highest point after the golf club 4 is taken back from address, as shown in FIG. 4B. Impact indicates a state at the moment in which the head 41 strikes the ball after the golf club 4 is swung down from top, as shown in FIG. 4C, and finish indicates a state in which the golf club 4 is swung through to the front after impact, as shown in FIG. 4D.

Also, the toe-heel direction, the face-back direction and a top-sole direction are defined based on a reference state. The reference state is a state in which the direction in which the shaft 40 extends is contained in a plane (hereinafter, reference perpendicular plane) that is perpendicular to the horizontal plane, and the head 41 is placed on the horizontal plane at predetermined lie and loft angles. The predetermined lie angle and loft angle are described in a product catalog, for example. The direction of the line of intersection of the reference perpendicular plane and the horizontal plane is the toe-heel direction, and the direction that is perpendicular to this toe-heel direction and parallel to the horizontal plane is the face-back direction. Also, the direction that is perpendicular to the horizontal plane is called the top-sole direction. Note that, in description of the present embodiment, unless particularly stated otherwise, "left-right" indicates the toe-heel direction, the toe side being the left and the heel side being the right. Also, unless particularly stated otherwise, the "up-down" indicates the top-sole direction, the top side being up and the sole side being down.

In the present embodiment, sensor data from the acceleration sensor 11 and the angular velocity sensor 12 is transmitted to the impact point estimation apparatus 2 in real time via the communication device 10. However, a configuration may be adopted in which, for example, the sensor data is stored in a memory device within the sensor unit 1, and the sensor data is retrieved from the memory device after the end of the swing motion and delivered to the impact point estimation apparatus 2.

1-2. Configuration of Impact Point Estimation Apparatus

The configuration of the impact point estimation apparatus 2 will be described, with reference to FIG. 2. The impact point estimation apparatus 2 is realized in terms of hardware a general-purpose personal computer, such as a desktop computer, a laptop computer, a tablet computer or a smartphone, for example. The impact point estimation apparatus 2 is manufactured by installing an impact point estimation program 3 in a general-purpose computer from a computer-readable recording medium 20 such as a CD-ROM and a USB memory or via a network such as the Internet. The impact point estimation program 3 is software for analyzing a golf swing based on sensor data that is sent from the sensor unit 1, and estimating the impact point on the face surface 41a. The impact point estimation program 3 causes the impact point estimation apparatus 2 to execute operations which will be discussed later.

The impact point estimation apparatus 2 is provided with a display part 21, an input part 22, a storage part 23, a control part 24, and a communication part 25. These parts 21 to 25 are connected via a bus line 26 and can communicate with each other. In the present embodiment, the display part 21 is constituted by a liquid crystal display or the like, and displays information that will be discussed later to a user. Note that a user as referred to here is a general term for a person who requires analysis results such as the golfer 7 or his or her instructor. Also, the input part 22 can be constituted by a mouse, a keyboard, a touch panel, and the like, and accepts operations on the impact point estimation apparatus 2 from a user.

The storage part 23 is constituted by a nonvolatile memory device such as a hard disk or a flash memory. Sensor data that is sent from the sensor unit 1 is saved to the storage part 23, in addition to the impact point estimation program 3 being stored therein. The storage part 23 also stores data (hereinafter, coefficient data) 28 indicating the coefficients of a regression equation that is used in estimating the impact point. The coefficient data 28 will be discussed in detail later. The communication part 25 is a communication interface enabling communication between the impact point estimation apparatus 2 and an external apparatus, and receives data from the sensor unit 1.

The control part 24 can be constituted by a CPU, a ROM, a RAM, and the like. The control part 24 operates in a virtual manner as a data acquisition part 24A, an impact point estimation part 24B, a mishit determination part 24C and an result output unit 24D, by reading out and executing the impact point estimation program 3 stored in the storage part 23. The operations of the parts 24A to 24D will be discussed in detail later.

2. Impact Point Estimation Processing

Figure 5:
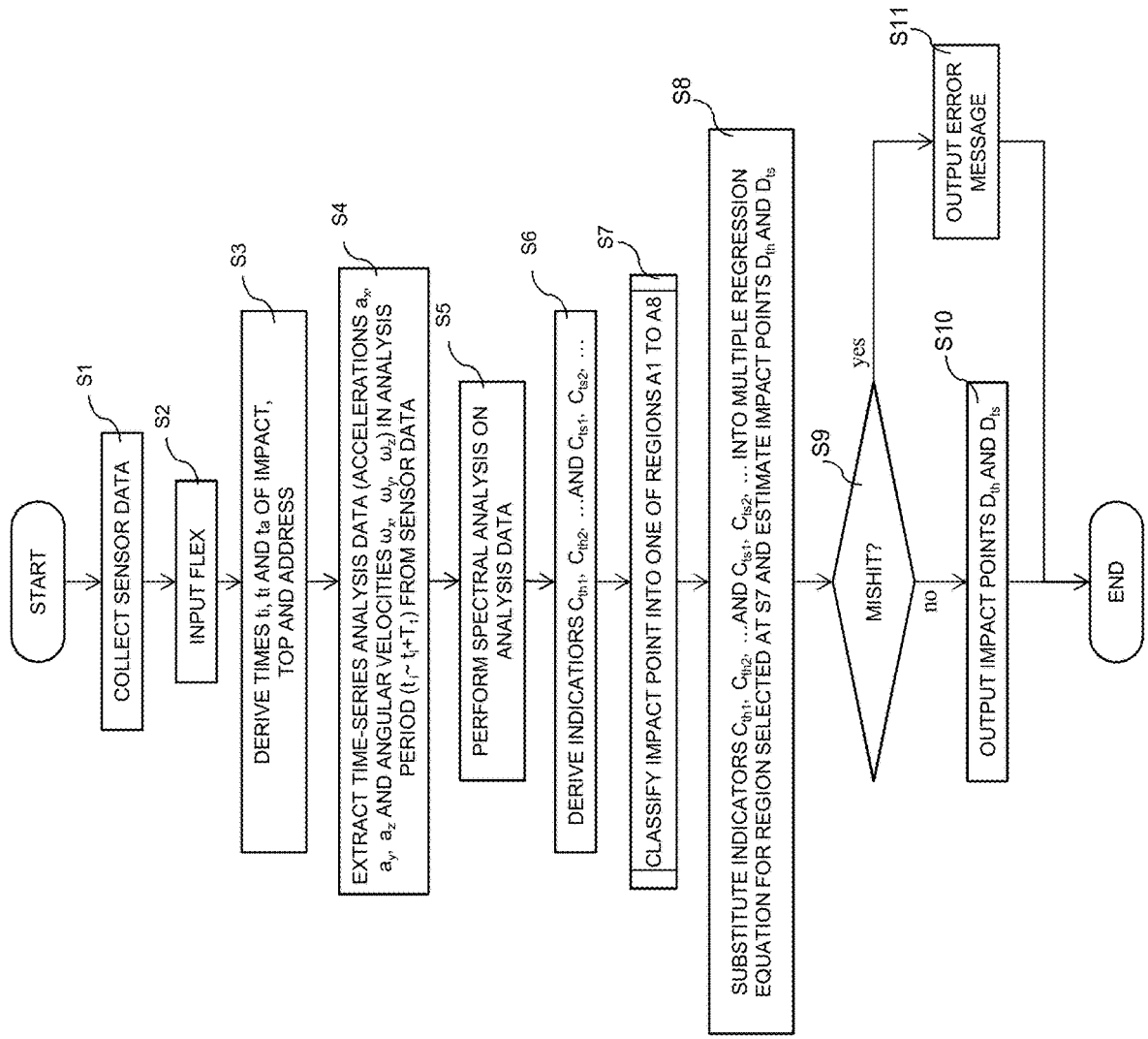
FIG. 5 is a flowchart showing the flow of impact point estimation processing.

Next, the impact point estimation processing that is executed by the swing analysis system 100 will be described, with reference to FIG. 5. FIG. 5 is a flowchart showing the flow of impact point estimation processing. The impact point estimation processing starts when execution of the impact point estimation processing is instructed by a user. In the present embodiment, coordinates $(D_{th}, D_{ts})$ of the impact point in a $D_{th}$-$D_{ts}$ plane (see FIG. 6) that is defined on the face surface 41a are specified. The origin of the $D_{th}$-$D_{ts}$ plane is a face center Fc, with the direction toward the heel side from the toe side being a $D_{th}$-axis positive direction, and the direction toward the top side from the sole side is a $D_{ts}$-axis positive direction.

First, in step S1, time-series sensor data that is output from the sensor unit 1 is acquired by the data acquisition part 24A. More specifically, the golf club 4 with the abovementioned sensor unit 1 attached is swung by the golfer 7. At this time, sensor data including time-series data of the accelerations $a_x$, $a_y$ and $a_z$ and the angular velocities $\omega_x$, $\omega_y$ and $\omega_z$ during the golf swing are detected by the sensor unit 1. These sensor data are transmitted to the impact point estimation apparatus 2 via the communication device 10 of the sensor unit 1. On the other hand, on the impact point estimation apparatus 2 side, the data acquisition part 24A receives this data via the communication part 25, and stores the received data in the storage part 23. In the present embodiment, the time-series sensor data from at least address to finish is collected.

Next, in step S2, information indicating the flex of the shaft 40 of the golf club 4 that is swung in step S1 is acquired by the data acquisition part 24A. Flex is one of the characteristics of the shaft 40, and is an indicator showing the rigidity (flexural rigidity) of the shaft 40. In the present embodiment, the data acquisition part 24A displays a predetermined screen on the display part 21, queries the user via the screen as to the type of flex of the shaft 40, and prompts the user to input the type of flex. The format of the query is preferably a selective format presenting the user with a list of the types of flex as options and prompting the user to select a response from these options. Note that the information indicating the flex is referred to when calculating an indicator $\varphi 2$, which will be discussed later, in step S7.

In the following step S3, the impact point estimation part 24B derives times $t_i$, $t_t$ and $t_a$ of impact, top and address, based on the sensor data that is stored in the storage part 23. Note that since various well-known algorithms can be used as the algorithm for calculating times $t_i$, $t_t$ and $t_a$ of impact, top and address that are based on the time-series data of angular velocity, acceleration and the like, detailed description is omitted here.

In the following step S4, the impact point estimation part 24B extracts the time-series data (analysis data) of the accelerations $a_x$, $a_y$ and $a_z$ and the angular velocities $\omega_x$, $\omega_y$ and $\omega_z$ in an analysis period near impact from the sensor data that is stored in the storage part 23. The analysis period as referred to here is, in the present embodiment, a period from time $t_i$ of impact to time $t_i + T_1$ of impact. For example, $T_1 = 500$ ms. Note that the analysis period may include an earlier period than time $t_i$ of impact.

In the following step S5, the impact point estimation part 24B performs spectral analysis on the analysis data acquired in step S4. Specifically, the impact point estimation part 24B performs Fast Fourier Transform on the time-series data of the accelerations $a_x$, $a_y$ and $a_z$ and the angular velocities $\omega_x$, $\omega_y$ and $\omega_z$ that are included in the analysis data, and derives spectra (including amplitude spectrum and phase spectrum) for each of the accelerations $a_x$, $a_y$ and $a_z$ and the angular velocities $\omega_x$, $\omega_y$ and $\omega_z$.

In the following step S6, the impact point estimation part 24B derives indicators $C_{th1}$, $C_{th2}$, ..., and $C_{thN}$ and $C_{ts1}$, $C_{ts2}$, ..., and $C_{tsM}$ for estimating the impact point, from the analysis data acquired at steps S4 and S5 and the spectra thereof. The indicators $C_{th1}$, $C_{th2}$, ..., $C_{thN}$ are indicators for estimating an impact point $D_{th}$ of the ball in the toe-heel direction, and the indicators $C_{ts1}$, $C_{ts2}$, ..., $C_{tsM}$ are the indicators for estimating an impact point $D_{ts}$ of the ball in the top-sole direction. The indicators $C_{th1}$, $C_{th2}$, ..., $C_{thN}$ and $C_{ts1}$, $C_{ts2}$, ..., $C_{tsM}$ are indicators whose value changes according to where on the face surface 41a the ball is struck, and are indicators that depend on the impact point. Also, many of the indicators $C_{th1}$, $C_{th2}$, ..., $C_{thN}$ and $C_{ts1}$, $C_{ts2}$, ..., $C_{tsM}$ are feature amounts that quantitatively represent features (including features of the spectrum of analysis data) of the waveform of analysis data. The indicators $C_{th1}$, $C_{th2}$, ..., $C_{thN}$ and $C_{ts1}$, $C_{ts2}$, ..., $C_{tsM}$ according to the present embodiment will be collectively discussed later.

Figure 6:
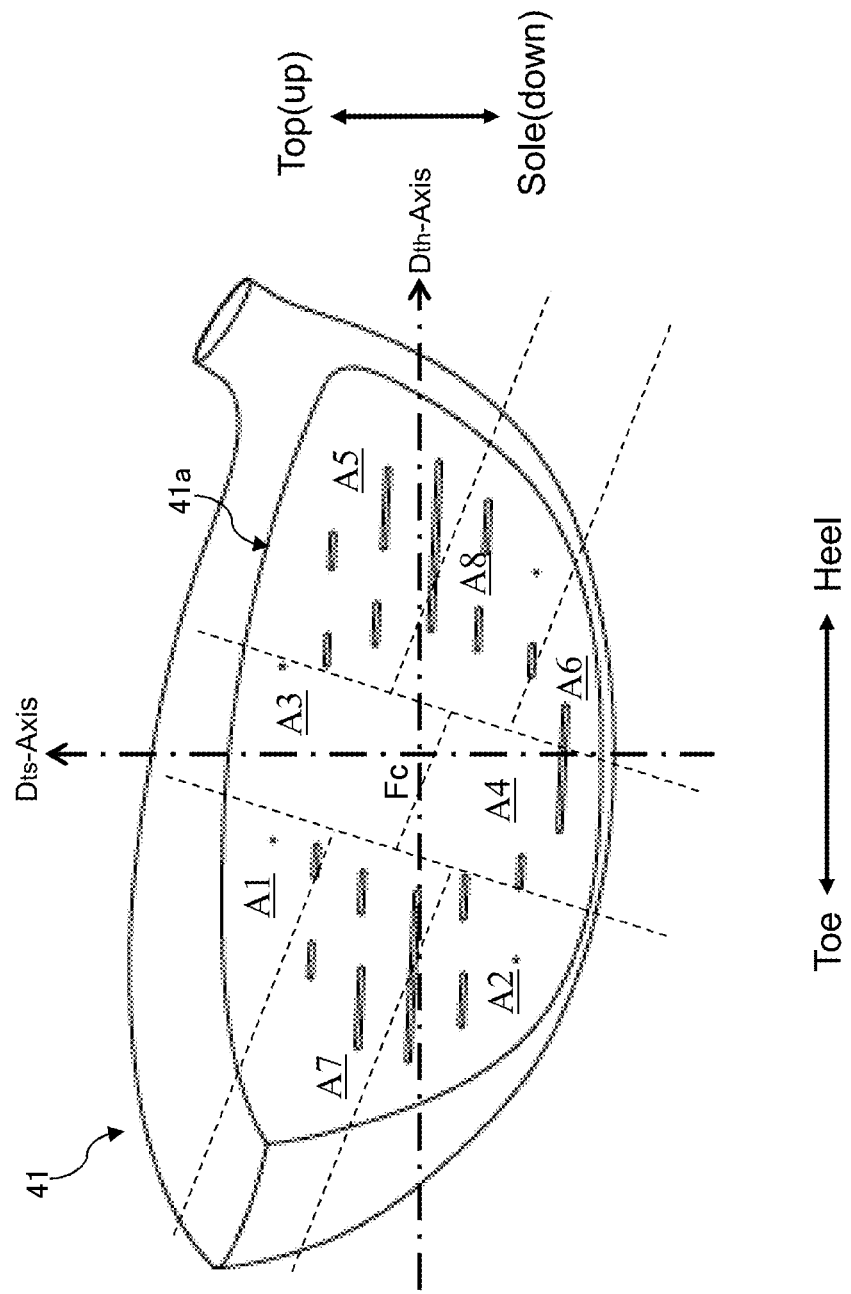
FIG. 6 is a diagram showing a face surface of a head.

In the following step S7, the impact point estimation part 24B classifies the impact point on the face surface 41a into one of a plurality of regions A1 to A8 (see FIG. 6), based on the analysis data acquired at steps S4 and S5 and the spectrum thereof. In FIG. 6, the boundary lines of the regions A1 to A8 are shown by dotted lines. Of these, the regions A3 and A4 are regions that extend in a vicinity of the center of the face surface 41a in the toe-heel direction (in a vicinity of the face center Fc in the toe-heel direction, and also in a vicinity of the sweet spot), the upper region being the region A3, and the lower region being the region A4. Also, the regions A7 and A8 are regions that extend along a line (hereinafter, simply referred to as the principal axis of inertia) obtained by the axis closest to the toe-heel direction out of the three principal axes of inertia of the head 41 being projected on the face surface 41*a*. The principal axis of inertia slopes at an angle smaller than 45 degrees with respect to the toe-heel direction on the face surface 41*a*, and extends from the upper toe to the lower heel. The region A7 and A8 are regions that extend a vicinity of the principal axis of inertia, the region at the upper toe being the region A7, and the region at the lower heel being the region A8. Also, the regions A1, A2, A5 and A6 are regions located respectively at the upper toe, lower toe, upper heel and lower heel, out of the remaining regions on the face surface 41*a*.

In step S7, four indicators f1, φ1, φ2 and H are derived as indicators for classifying the impact point into the regions A1 to A8. First, the indicators f1 and φ1 are indicators for determining the position of the impact point on the face surface 41*a* in the toe-heel direction. φ2 is an indicator for determining the position of the impact point on the face surface 41*a* in the up-down direction. H is an indicator for determining whether the impact point exists in a vicinity of the principal axis of inertia, or in other words, whether the impact point belongs to the regions A7 and A8. In step S7, the impact point is then classified into one of the regions A1 to A8, according to the calculated indicators f1, φ1, φ2 and H (steps S71 to S78), and, further thereafter, whether the classification is correct is reviewed (step S79). More specifically, in step S79, in the case where an exception condition is satisfied, exception processing for reclassifying the impact point into another region that is included in the regions A1 to A8 is performed.

Figure 7:
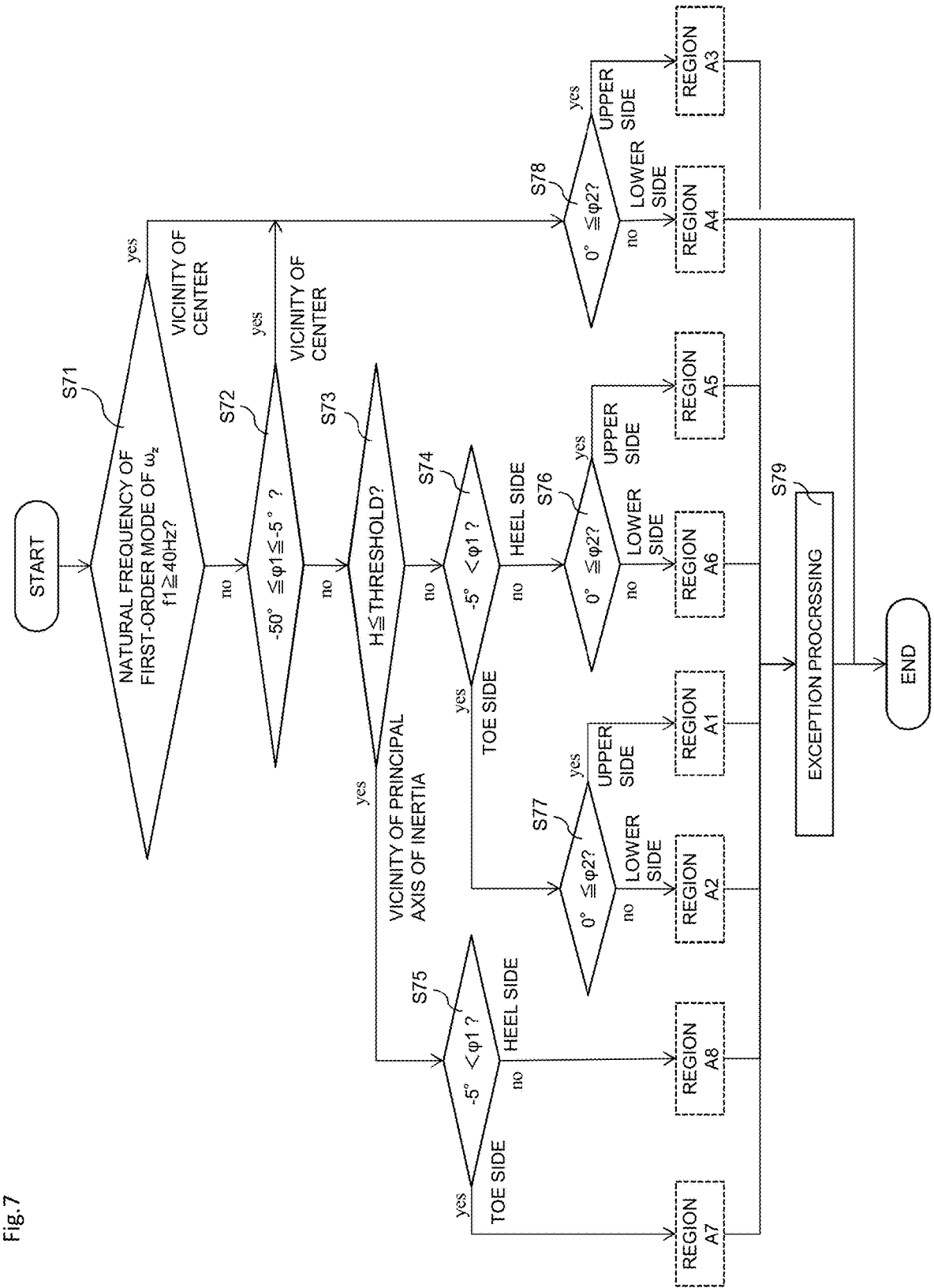
FIG. 7 is a flowchart showing the flow of processing for classifying a region to which the impact point belongs, which is included in the impact point estimation processing.

More specifically, the processing of step S7 for classifying the impact point proceeds in accordance with the sub-steps S71 to S79 shown in FIG. 7. First, as step S71, the impact point estimation part 24B derives a peak frequency f1 of a first-order mode, that is, a first natural frequency f1, based on the spectrum of the angular velocity $\omega_z$ (see FIG. 10). If f1 is greater than or equal to a predetermined value, which in the present embodiment is f1≥40 Hz, the impact point estimation part 24B determines that the impact point of the ball is included in one of the region A3 and A4 in a vicinity of the center in the toe-heel direction, and the processing advances to step S78. If this is not the case, the processing advances to step S72. Note that in the case where the ball is struck in a vicinity of the center in the toe-heel direction, a torsion mode tends not to occur in the head 41 and the shaft 40. Also, even though there are differences according to the type of golf club, the first peak frequency of the torsion mode will usually be roughly 25 Hz. Accordingly, in the case where the first peak frequency f1 is greatly removed from this value, it can be estimated that the ball was struck in a vicinity of the center in the toe-heel direction. Step S71 utilizes this principle.

Figure 10:
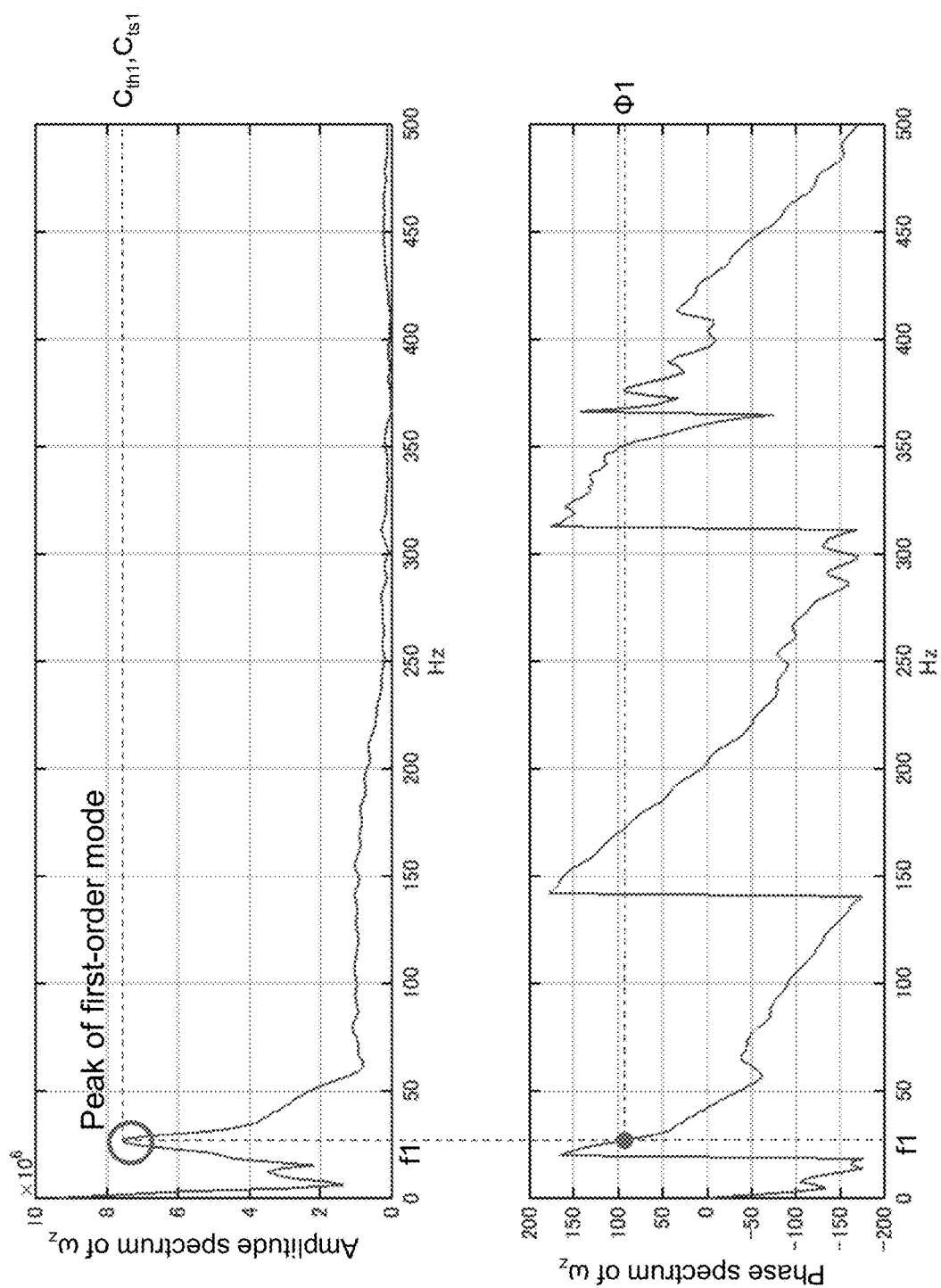
FIG. 10 is a diagram illustrating a first indicator.

In step S72, the impact point estimation part 24B derives a phase angle φ1 corresponding to the peak frequency f1 of the first-order mode, based on the spectrum of the angular velocity $\omega_z$ (see FIG. 10). In the case where φ1 is within a predetermined range, which in the present embodiment is −50°≤φ1≤5°, the impact point estimation part 24B then determines that the impact point of the ball is included in one of the region A3 and A4 in a vicinity of the center in the toe-heel direction, and the processing advances to step S78. If this is not the case, the processing advances to step S73. Note that, in the case where the ball is struck to the toe side and to the heel side from the face center Fc in the toe-heel direction, waveforms of analysis data following a torsion period in which the phase angles φ1 are shifted by 90 degrees to each other are thought to occur. In contrast, in the case where the ball is struck in a vicinity of face center Fc in the toe-heel direction, the phase angle φ1 will be in a vicinity of 0 degrees. Accordingly, in the case where the phase angle φ1 is in a vicinity of 0 degrees, which here is −50°≤φ1≤5°, it can be estimated that the ball was struck in a vicinity of the center in a vicinity of the center in the toe-heel direction.

Figure 8:
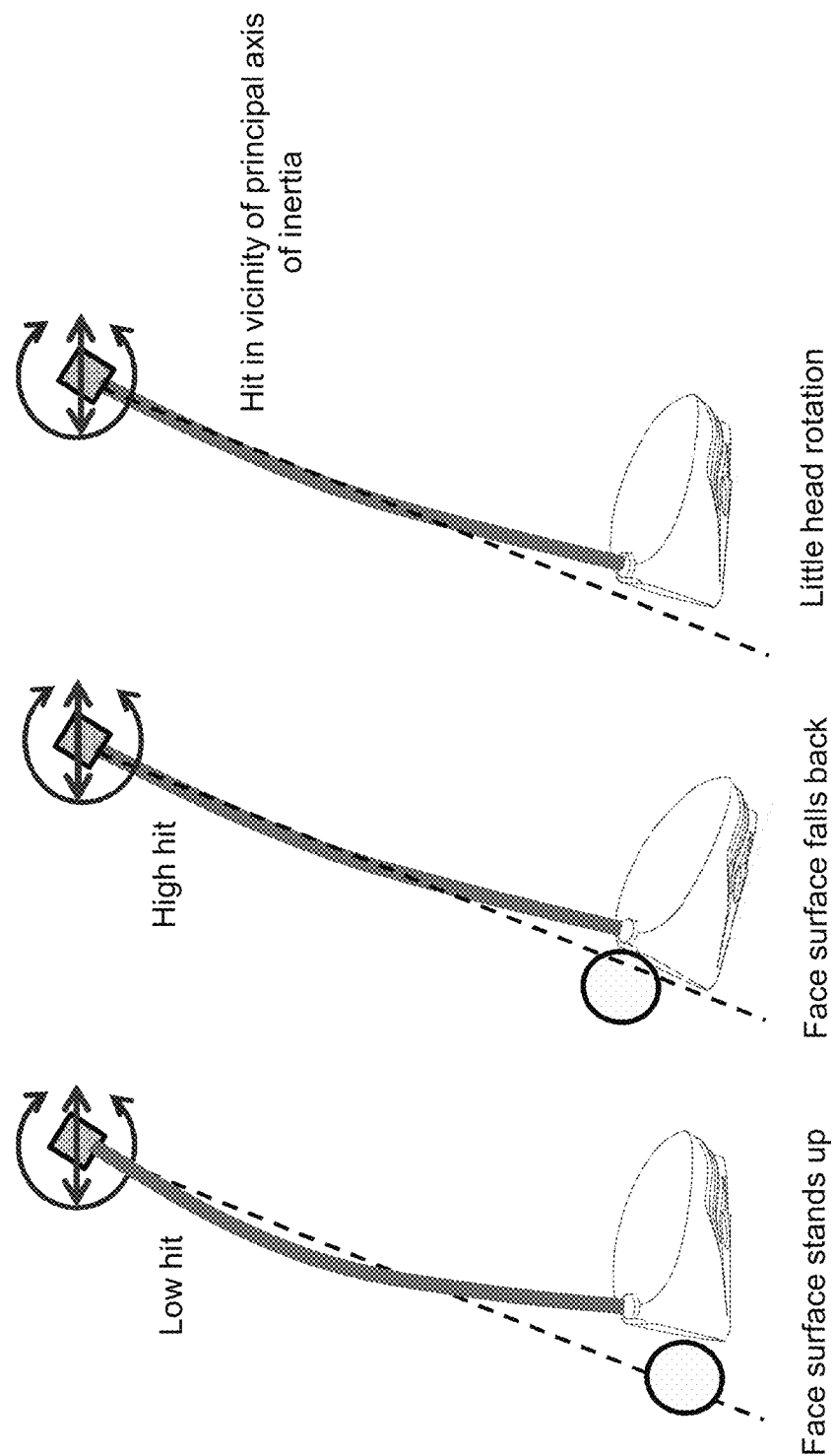
FIG. 8 is a diagram illustrating the behavior of the head in the case where a lower part, an upper part and a vicinity of a principal axis of inertia of the face surface hit the ball.

In step S73, the impact point estimation part 24B derives an indicator H representing the magnitude of the amplitude spectrum of $\omega_x$ in a high-order mode (e.g., third or fourth-order mode) or at a frequency corresponding thereto, based on the amplitude spectrum of $\omega_x$. In the present embodiment, the integral value of the amplitude spectrum of $\omega_x$ at 150 Hz to 350 Hz, which is a frequency band in which the fourth-order mode is thought to appear is calculated as the indicator H. The impact point estimation part 24B then determines whether H is less than or equal to a predetermined threshold, and, if H is less than or equal to the predetermined threshold, determines that the impact point of the ball is included in one of the region A7 and A8 that are a vicinity of the principal axis of inertia, and the processing advances to step S75. If this is not the case, the impact point estimation part 24B determines that the impact point of the ball is included in one of the remaining regions A1, A2, A5 and A6, and the processing advances to step S74. Note that if the ball is struck with the face surface 41*a* in a vicinity of the principal axis of inertia, the head 41 does not rotate much, whereas if the ball is struck in an upper part, the face surface 41*a* falls back, and if the ball is struck in a lower part, the face surface 41*a* stands up (see FIG. 8). As a result, in the case where the ball is struck with the face surface 41*a* in a vicinity of the principal axis of inertia, there is a tendency for a high frequency component to not occur in the time-series data of $\omega_x$. Step S73 determines whether the impact point exists on the face surface 41*a* in a vicinity of the principal axis of inertia, according to the size of the indicator H indicating the magnitude of the amplitude spectrum in a high-frequency mode, utilizing this principle.

Note that, in step S73, as the indicator H for determining whether the impact point exists in a vicinity of the principal axis of inertia, an indicator representing the magnitude of the amplitude spectrum of the acceleration $a_y$ corresponding to a high-order mode can also be used, instead of the angular velocity $\omega_x$.

In step S74, the impact point estimation part 24B determines whether the above-mentioned phase angle φ1 is larger than a predetermined value, and in the present embodiment determines whether the phase angle φ1 is larger than −5 degrees. In the case where the phase angle φ1 is larger than −5 degrees, the impact point estimation part 24B determines that the impact point of the ball is included in the region A1 or A2 on the toe side, and the processing advances to step S77. If this is not the case, the impact point estimation part 24B determines that the impact point of the ball is included in the region A5 or A6 on the heel side, and the processing advances to step S76. Note that it is thought that a waveform of the analysis data in which the phase angle φ1 will be positive occurs in the case where the ball is struck to the toe side from the face center Fc, and a waveform of the analysis data in which the phase angle φ1 will be negative occurs in the case where the ball is struck to the heel side. Accordingly, it can be estimated whether the ball was struck on the toe side or the heel side of the face surface 41a by whether the phase angle φ1 is positive or negative.

In step S75, a similar determination to step S74 is performed. Specifically, in step S75, the impact point estimation part 24B determines whether the abovementioned phase angle φ1 is larger than a predetermined value, and determines that the impact point of the ball is included in the region A7 on the toe side if larger, and that the impact point of the ball is included in the region A8 on the heel side if not larger. After step S75, the processing advances to step S79.

Figure 9:
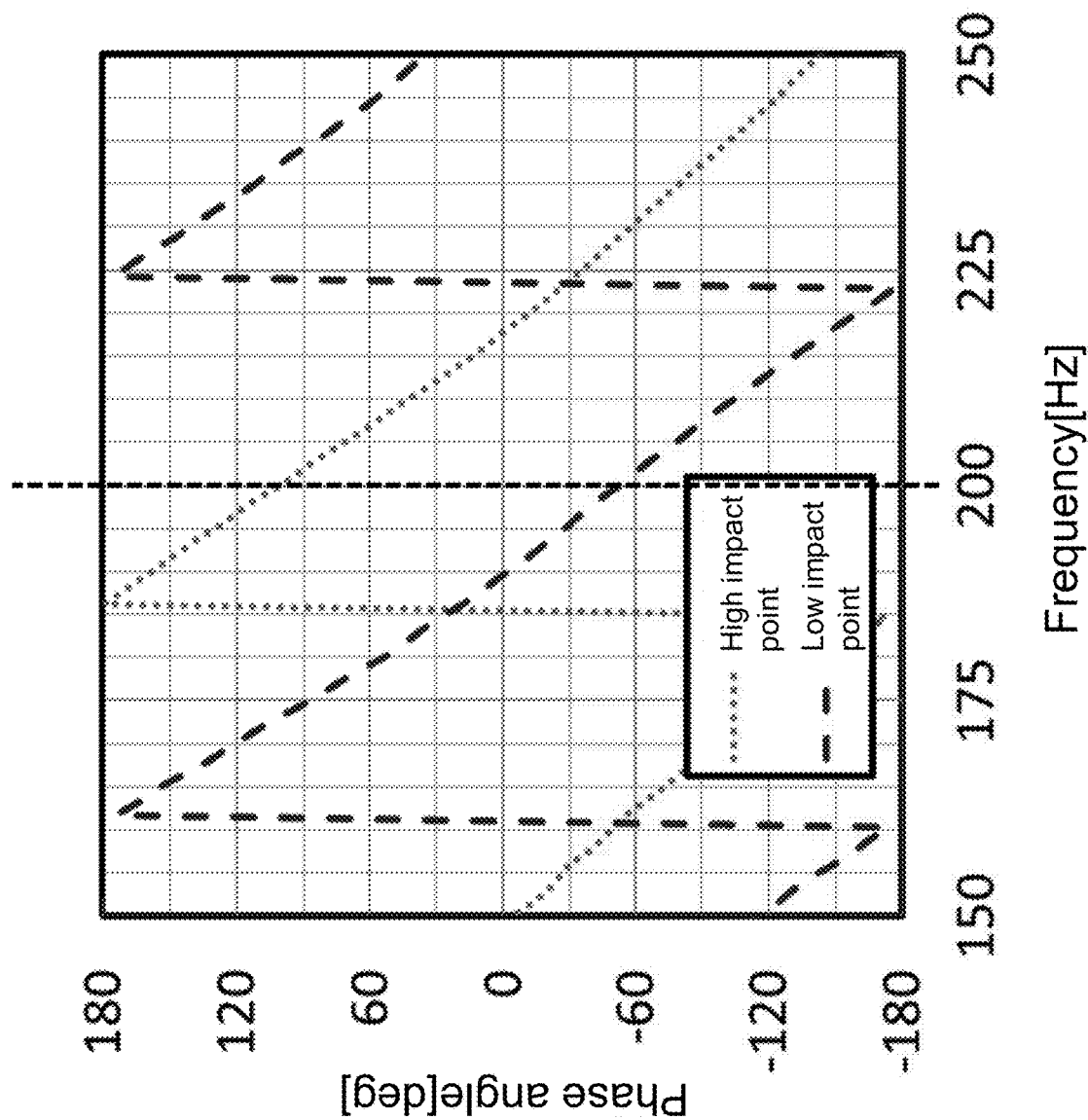
FIG. 9 is a graph showing a phase spectrum in the case where a lower part and an upper part of the face surface hit the ball.

In step S76, the impact point estimation part 24B derives a phase angle φ2 corresponding to a specific frequency $f_m$ that is included in a frequency band in which a high-order mode (typically, third or fourth) is thought to appear, based on the spectrum of the angular velocity $\omega_x$. In the present embodiment, the phase angle φ2 is a phase angle in a vicinity of 200 Hz at which the fourth-order mode is thought to appear. In the case where φ2 is greater than or equal to a predetermined value, which in the present embodiment is 0°≤φ2, the impact point estimation part 24B then determines that the impact point of the ball is included in the upper region A5. On the other hand, in the case where φ2 is smaller than the predetermined value, which in the present embodiment is 0°>φ2, the impact point estimation part 24B determines that the impact point of the ball is included in the lower region A6. Note that a graph of the phase angle of the angular velocity $\omega_x$ in the case where the impact point has shifted upward and has shifted downward from the face center Fc will be as shown in FIG. 9. Accordingly, when the phase angle φ2 in a specific frequency $f_m$ is focused on, it can be estimated whether the impact point is high or low by whether the phase angle φ2 is greater than or equal to a predetermined value or not.

Note that, in step S76, as the indicator φ2 for determining the position of the impact point in the up-down direction, a phase angle corresponding to a specific frequency $f_m$ of the spectrum of the acceleration $a_y$ can also be used, instead of the angular velocity $\omega_x$.

Also, in the present embodiment, a specific frequency $f_m$ is determined according to flex, which is one of the characteristics of the shaft 40. Specifically, the impact point estimation part 24B determines the frequency $f_m$, by collating the flex designated at step S2 with the following Table 1 that is stored in advance in the storage part 23. Note that since Table 1 is a table for determining the frequency $f_m$ of the type of a given head, tables for determining the frequency $f_m$ according to the type of head may be stored. In this case, the data acquisition part 24A prompts the user to input the type of head, and selects a specific table for determining the frequency $f_m$ from a plurality of tables such as Table 1 respectively corresponding to a plurality of heads, according to the input type of head.

TABLE 1

| Flex | Freq. $f_m$ [Hz] |
| --- | --- |
| R | 222.8 |
| SR | 215 |
| S | 207.5 |
| X | 200 |

The influence of hitting the ball on the face surface 41a will be transmitted from the head 41 through the shaft 40 to the sensor unit 1 that is attached to the grip 42. Accordingly, the waveform of the sensor data that is output from the sensor unit 1 tends to be affected by the characteristics of the shaft 40. In this regard, in step S76 according to the present embodiment, the indicator φ2 for determining the position of the impact point in the up-down direction is determined with consideration for flex, thus allowing the accuracy with which the impact point is estimated using the indicator φ2 to be enhanced. Note that the information in Table 1 can be obtained, for example, by performing numerous practice hits in advance and calculating the optimal frequency for determining the indicator φ2 through parameter studies, based on the data obtained at this time.

In step S77, a similar determination to step S76 is performed. Specifically, in step S77, the impact point estimation part 24B determines whether the abovementioned phase angle φ2 is greater than or equal to a predetermined value, and determines that the impact point of the ball is included in the upper region A1 if greater than or equal to the predetermined value, and that the impact point of the ball is included in the lower region A2 if smaller than the predetermined value. After step S77, the processing advances to step S79.

A similar determination to step S76 and S77 is also performed in step S78. Specifically, in step S78, the impact point estimation part 24B determines whether the abovementioned phase angle φ2 is greater than or equal to a predetermined value, and determines that the impact point of the ball is included in the upper region A3 if greater than or equal to the predetermined value, and that the impact point of the ball is included in the lower region A4 if smaller than the predetermined value. If it is determined in step S78 that the impact point is included in the region A3, the processing advances to step S79. If this is not the case, step S7 ends.

The exception processing of step S79 is a step for checking the validity of the classification of the region in steps S71 to S78 using another indicator, and performing correction as appropriate, in the case where it is determined to be in error. Specifically, the impact point estimation part 24B, in accordance with the information in Table 2 that is stored in advance in the storage part 23, determines whether the region classified at steps S71 to S78 is included in the left column, and, if included, determines whether at least one of the exception conditions on the right side thereof in Table 2 is satisfied, and, if satisfied, reclassifies the impact point to the region that is shown further on the right side thereof in Table 2.

TABLE 2

| Impact Point Region Before Correction | Exception Conditions | Impact Point Region After Correction |
| --- | --- | --- |
| A1 | $C_{ts3}$ > threshold | A2 |
|  | $C_{ts2}$ > threshold |  |
| A2 | $C_{ts3}$ < threshold | A1 |
|  | $C_{ts4}$ < threshold |  |
|  | $C_{ts8}$ < threshold |  |
|  | $C_{ts10}$ < threshold |  |
| A3 | $C_{ts5}$ > threshold | A4 |
| A5 | $C_{ts2}$ > threshold | A6 |
| A6 | $C_{ts2}$ < threshold | A5 |
|  | $C_{ts3}$ < threshold |  |
|  | $C_{ts4}$ < threshold |  |
|  | $C_{ts5}$ < threshold |  |
| A7 | $C_{ts4}$ > threshold | A2 |
| A8 | $C_{ts2}$ < threshold | A5 |
|  | $C_{ts4}$ < threshold |  |
|  | $C_{ts3}$ > threshold | A6 |

In the present embodiment, the position of the impact point in the up-down direction is corrected by the exception processing of step S79, as shown in Table 2. Thus, the indicators that are referred to here are indicators that have a high correlation with the position of the impact point in the up-down direction (at least at the position of the impact point in the toe-heel direction specified by steps S71 to S78), and, in the present embodiment, are the indicators $C_{ts2}$ to $C_{ts5}$, $C_{ts8}$ and $C_{ts10}$ that are included among the indicators calculated in step S6 and will be discussed later. Also, the exception condition is determined by whether the indicator exceeds a threshold. After the above processing finishes, step S7 ends.

In the following step S8, the impact point estimation part 24B estimates the impact point $D_{th}$ of the ball on the face surface 41a in the toe-heel direction, according to the indicators $C_{th1}$, $C_{th2}$, ..., $C_{thN}$ derived at step S6. More specifically, the impact point $D_{th}$ is calculated, in accordance with the following equation in which the impact point $D_{th}$ is the objective variable and the indicators $C_{th1}$, $C_{th2}$, ..., $C_{thN}$ are explanatory variables. Note that the values of coefficients $k_{th0}$, $k_{th1}$, $k_{th2}$, ..., and $k_{thN}$ that are used here are defined for each of the regions A1 to A8. Accordingly, in step S8, a set of coefficients corresponding to the region to which the impact point is ultimately classified at step S7 is selected from these plurality of sets of coefficients, and used in estimating the impact point.

$$D_{th}=k_{th0}+k_{th1} \cdot C_{th1}+k_{th2} \cdot C_{th2}+ \ldots +k_{thN} \cdot C_{thN} \quad (1)$$

The values of coefficients $k_{th0}$, $k_{th1}$, $k_{th2}$, ..., $k_{thN}$ are calculated through testing, and stored in advance in the storage part 23 as the coefficient data 28. Specifically, numerous practice hits are performed and the impact point $D_{th}$ and the indicators $C_{th1}$, $C_{th2}$, ..., $C_{thN}$ at the time of each practice hit are calculated, and multiple regression analysis is performed thereon to specify the coefficient $k_{th0}$, $k_{th1}$, $k_{th2}$, ..., and $k_{thN}$. The impact point used in multiple regression analysis can be determined with high accuracy by, for example, shooting the golf swing using a plurality of cameras and performing image processing thereon. Also, in the testing, the impact point at the time of each practice hit is classified into one of the regions A1 to A8, in accordance with a similar algorithm to step S7. Multiple regression analysis is then executed for each of these regions A1 to A8 to calculate coefficients $k_{th0}$, $k_{th1}$, $k_{th2}$, ..., and $k_{thN}$ for impact point estimation that are suitable for impact points that respectively belong to these regions or a vicinity thereof.

Similarly, the impact point estimation part 24B estimates the impact point $D_{ts}$ of the ball on the face surface 41a in the top-sole direction, according to the indicators $C_{ts1}$, $C_{ts2}$, ..., and $C_{tsM}$ derived at step S6. More specifically, the impact point $D_{ts}$ is calculated, in accordance with the following equation in which the impact point $D_{ts}$ is the objective variable and the indicators $C_{ts1}$, $C_{ts2}$, ..., $C_{tsM}$ are explanatory variables. Note that the values of coefficients $k_{ts0}$, $k_{ts1}$, $k_{ts2}$, ..., and $k_{tsM}$ that are used here are also defined for each of the regions A1 to A8. Accordingly, in step S8, a set of coefficients corresponding to the region to which the impact point is ultimately classified in step S7 is selected from these plurality of sets of coefficients, and used in estimating the impact point. Note that the values of the coefficients $k_{ts0}$, $k_{ts1}$, $k_{ts2}$, ..., and $k_{tsM}$ are calculated in advance through similar testing to the case of the values of the coefficients $k_{th0}$, $k_{th1}$, $k_{th2}$, ..., $k_{thN}$, and stored in advance in the storage part 23 as the coefficient data 28.

$$D_{ts}=k_{ts0}+k_{ts1} \cdot C_{ts1}+k_{ts2} \cdot C_{ts2}+ \ldots +k_{tsM} \cdot C_{tsM} \quad (2)$$

Note that all of the indicators $C_{th1}$, $C_{th2}$, ..., and $C_{thN}$ that are used in estimating the impact point $D_{th}$ do not necessarily need to have a high correlation with the impact point $D_{th}$. Even if some of the indicators have a low correlation, the coefficient $k_{thi}$ of the multiple regression equation corresponding to such indicators will, in that case, be set to a small value. Accordingly, the accuracy of the estimation value of the impact point $D_{th}$ is maintained, as long as at least some indicators having a high correlation are included. Naturally, the indicator $C_{thi}$ having a low correlation may be omitted from the multiple regression equation. The same also applies to the indicators $C_{ts1}$, $C_{ts2}$, ..., and $C_{tsM}$ for estimating the impact point $D_{ts}$.

In the following step S9, mishit determination is performed by the mishit determination part 24C. Specifically, the mishit determination part 24C determines whether the indicators $C_{th1}$ to $C_{th5}$ and $C_{th8}$ to $C_{th10}$ and the indicators $C_{ts1}$ to $C_{ts5}$ and $C_{ts8}$ to $C_{ts10}$ calculated at step S6 are respectively within a predetermined range. In the case where the indicators $C_{th1}$ to $C_{th5}$ and $C_{th8}$ to $C_{th10}$ and the indicators $C_{ts1}$ to $C_{ts5}$ and $C_{ts8}$ to $C_{ts10}$ are outside the predetermined range, the mishit determination part 24C then determines that a mishit has occurred. Note that, in the present embodiment, the threshold (boundary values defining the above-mentioned predetermined range) that is used in mishit determination is defined for each of the regions A1 to A8, and, in step S9, mishit determination is performed, based on the threshold corresponding to the region to which the impact point is ultimately classified in step S7. Also, in the present embodiment, in the case where at least one of the indicators $C_{th1}$ to $C_{th5}$, $C_{th8}$ to $C_{th10}$ and the indicators $C_{ts1}$ to $C_{ts5}$ and $C_{ts8}$ the $C_{ts10}$ is outside the predetermined range, it is determined that a mishit has occurred.

In step S9, mishit determination is also performed from another viewpoint by the mishit determination part 24C. That is, in the case where the impact point ($D_{th}$, $D_{ts}$) derived at step S8 is outside the predetermined range, such as in the case where −40 mm≤$D_{th}$≤40 mm and −30 mm≤$D_{ts}$≤30 mm are not satisfied, for example, it is determined that a mishit has occurred.

If it is determined by the above processing that a mishit has occurred, the processing advances to step S11. If this is not the case, the processing advances to step S10.

In step S10, the result output unit 24D displays information of the impact point ($D_{th}$, $D_{ts}$) derived at step S8 on the display part 21. At this time, the coordinates of the impact point may be displayed numerically, or alternatively or in addition thereto, the impact point may be displayed graphically by generating an image in which a graphic indicating the position of the impact point is superimposed on a graphic indicating the face surface 41a. On the other hand, in step S11, the result output unit 24D displays a message such as "The impact point could not be estimated because the ball was hit with an edge portion of the face" on the display part 21. After steps S10 and S11, the impact point estimation processing ends.

2-1. Indicators

Hereinafter, the indicators $C_{th1}$, $C_{th2}$, ..., $C_{thN}$ and $C_{ts1}$, $C_{ts2}$, ..., $C_{tsM}$ according to the present embodiment will be described. In the present embodiment, N=M=11, and, furthermore, the indicator $C_{thi}=C_{tsi}$ (i=1, 2, ..., 11).

2-1-1. First Peak Amplitude of Spectrum of Angular Velocity $\omega_z$

The first indicator $C_{th1}=C_{ts1}$ according to the present embodiment is the peak amplitude of the first-order mode of the spectrum of the angular velocity about the axis in the shaft 40 direction, that is, $\omega_z$ (see FIG. 10). This indicator represents the torsion component of the shaft 40. Also, the testing performed by the inventors confirmed that this indicator is highly correlated with the impact point $D_{th}$ in the left-right direction. Note that, in this testing, one golfer was made to swing the golf club a large number of times (approx. 30 swings/balls in total) using a golf club similar to the golf club 4 according to the present embodiment. The golf club was a golf club to which an acceleration sensor and an angular velocity sensor were attached to the end of the grip, to obtain sensor data of acceleration and angular of velocity At this time, measurement was performed for $t_i-2s$ to $t_i+0.5s$, with a sampling period $\Delta t=1$ ms. Sensor data was acquired with the impact points distributed over the entirety of the face surface 41*a*. The indicators $C_{th1}, C_{th2}, \ldots, C_{thN}$ and $C_{ts1}, C_{ts2}, \ldots, C_{tsM}$ were then calculated, based on this measurement data. Also, the golf swing was simultaneously shot using a plurality of cameras, and the impact point specified thereby was taken as the true value. The correlation between the true value of this impact point and the indicator $C_{th1}=C_{ts1}$ was then investigated. Note that verification results relating to correlation of the second to fifth indicators and the eighth to tenth indicators, which will be discussed below, were also obtained through this testing.

2-1-2. Secondary Peak Amplitude of Spectrum of Acceleration $a_y$

Figure 11:
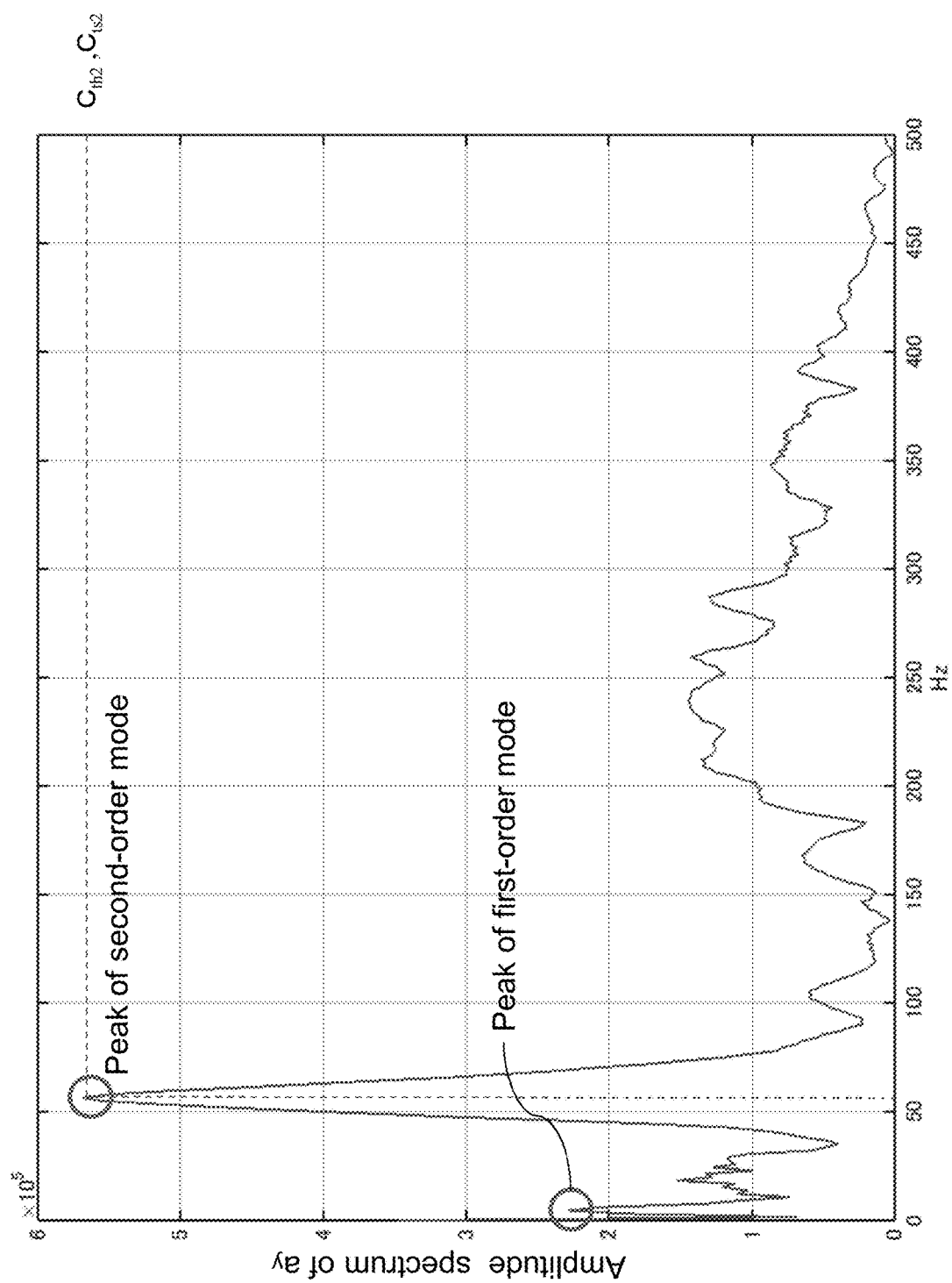
FIG. 11 is a diagram illustrating a second indicator.

A second indicator $C_{th2}=C_{ts2}$ according to the present embodiment is the peak amplitude of the second-order mode of the spectrum of the acceleration in the ball flight direction, that is, $a_y$ (see FIG. 11). This indicator represents the deflection component of the shaft 40. Also, testing performed by the inventors confirmed that this indicator is highly correlated with both the impact point $D_{ts}$ in the up-down direction and the impact point $D_{th}$ in the left-right direction.

2-1-3. Secondary Peak Amplitude of Spectrum of Angular Velocity $\omega_x$

Figure 12:
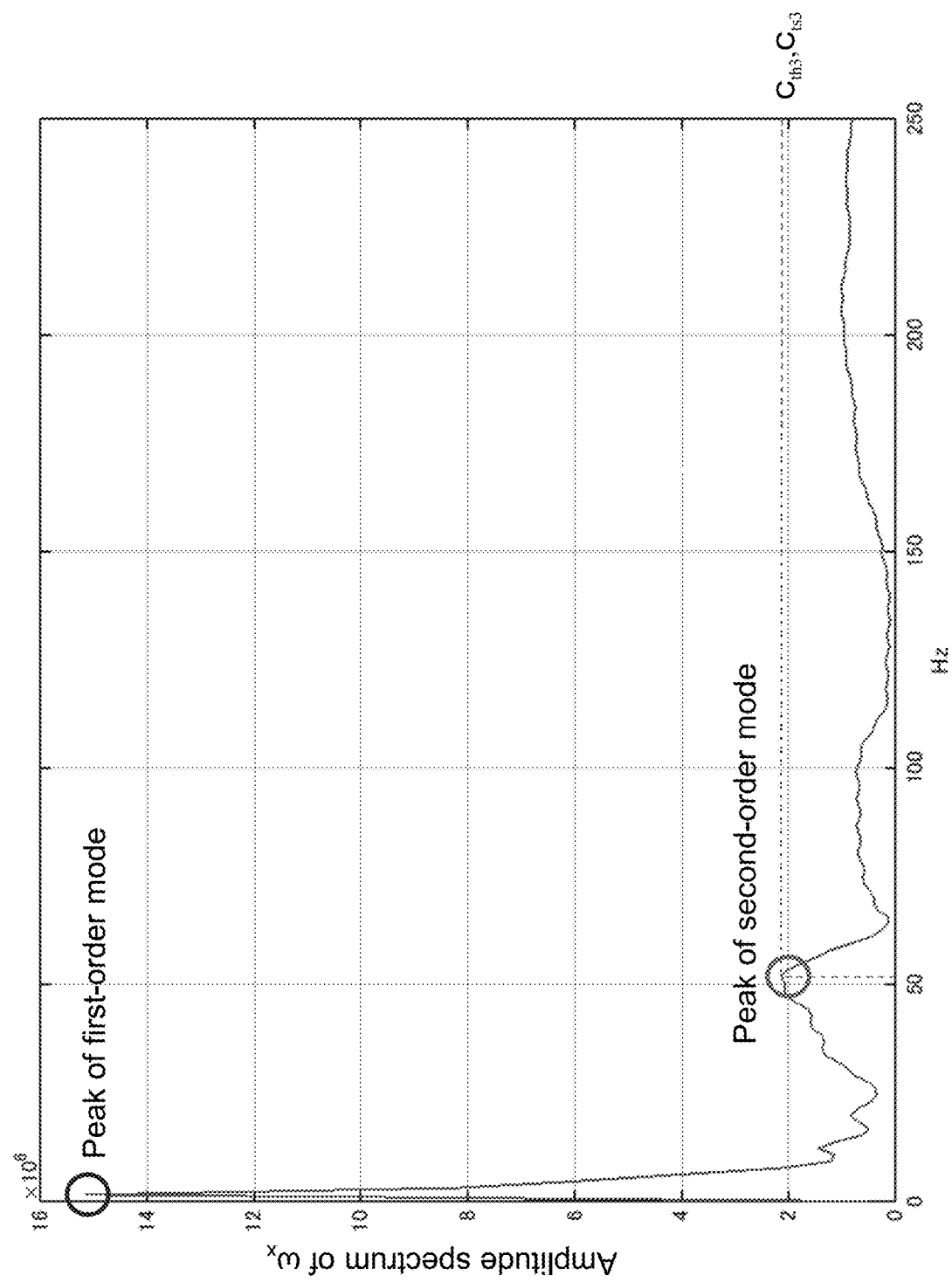
FIG. 12 is a diagram illustrating a third indicator.

A third indicator $C_{th3}=C_{ts3}$ according to the present embodiment is the peak amplitude of the second-order mode of the spectrum of angular velocity about the axis in the toe-heel direction, that is, $\omega_x$ (see FIG. 12). This indicator represents the deflection component of the shaft 40. Also, testing performed by the inventors confirmed that this indicator is highly correlated with both the impact point $D_{ts}$ in the up-down direction and the impact point $D_{th}$ in the left-right direction. Also, correlation with the impact point $D_{ts}$ in the up-down direction, in particular, was high.

Figure 13:
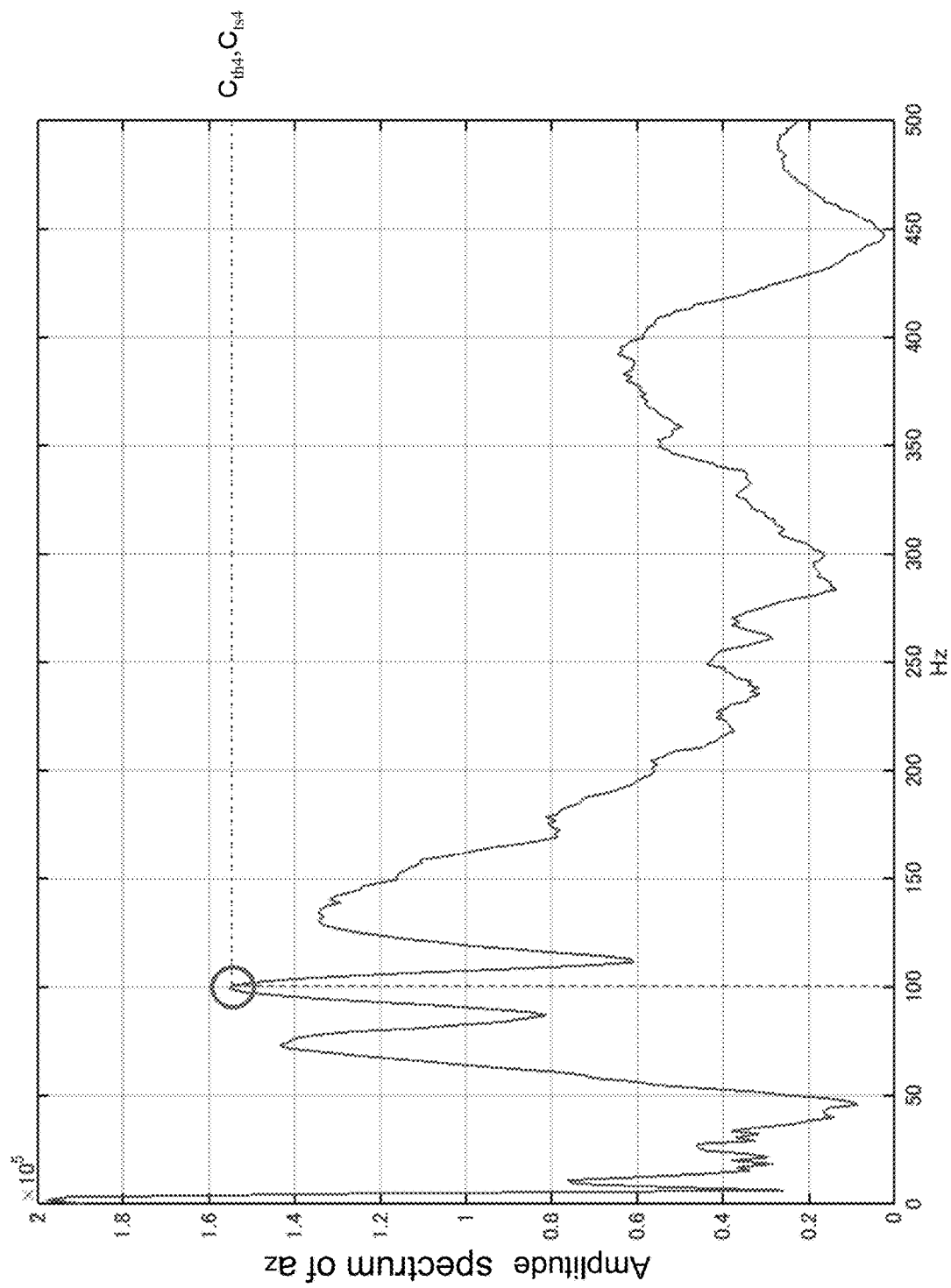
FIG. 13 is a diagram illustrating a fourth indicator.

2-1-4. Maximum Amplitude of Spectrum of Acceleration $a_z$ in Predetermined Frequency Band A fourth indicator $C_{th4}=C_{ts4}$ according to the present embodiment is the peak magnitude in a predetermined frequency band (vicinity of 50-100 Hz) of the spectrum of acceleration in the shaft 40 direction, that is, $a_z$ (see FIG. 13). This indicator represents the vibration component of the shaft 40 in the lengthwise direction. Also, testing performed by the inventors confirmed that this indicator is highly correlated with the impact point $D_{ts}$ in the up-down direction.

2-1-5. Maximum of Angular Velocity $\omega_y$ Immediately after Impact

Figure 14:
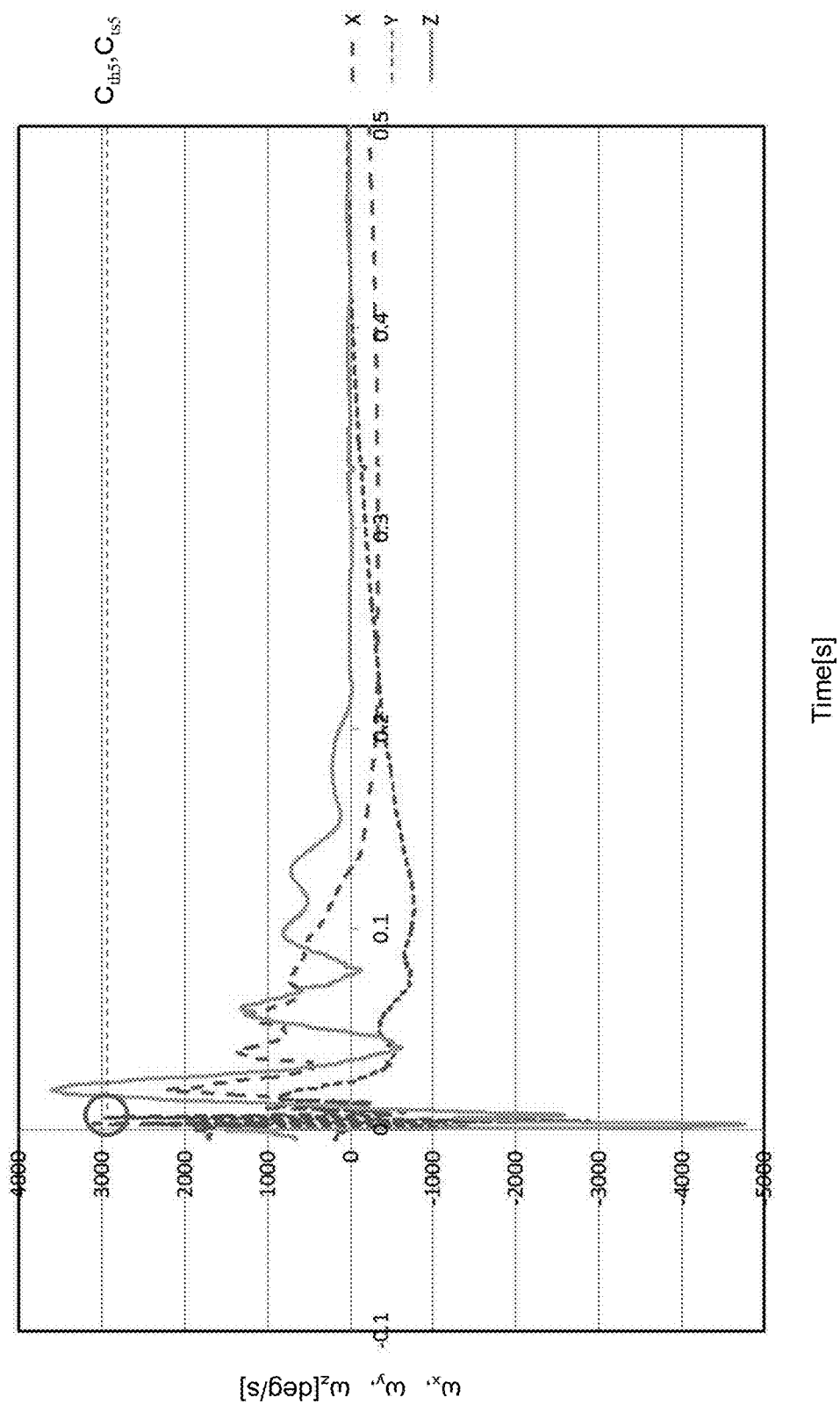
FIG. 14 is a diagram illustrating a fifth indicator.

A fifth indicator $C_{th5}=C_{ts5}$ according to the present embodiment is the maximum value immediately after (e.g., from time $t_i$ to 0.1 second after) impact of angular velocity about the axis of the direction in the ball flight direction, that is, $\omega_y$ (see FIG. 14). This indicator represents the shearing component of the head 41. Also, testing performed by the inventors confirmed that this indicator has at least a given correlation with both the impact point $D_{ts}$ in the up-down direction and the impact point $D_{th}$ in the left-right direction.

2-1-6. Angular Velocity $\omega_x$ at Time of Impact

A sixth indicator $C_{th6}=C_{ts6}$ according to the present embodiment is the angular velocity about the axis in the toe-heel direction at the time of impact, that is, $\omega_x$ at the time of impact. This indicator is for evaluating the type and capability of the golfer.

2-1-7. Angular Velocity $\omega_z$ at Time of Impact

A seventh indicator $C_{th7}=C_{ts7}$ according to the present embodiment is the angular velocity about the axis in the shaft 40 direction at the time of impact, that is, $\omega_z$ at the time of impact. This indicator is for evaluating type and capability of the golfer.

2-1-8. Amplitude of Angular Velocity $\omega_x$

An eighth indicator $C_{th8}=C_{ts8}$ according to the present embodiment is the amplitude of the angular velocity about the axis in the toe-heel direction, that is, $\omega_x$. In the present embodiment, this is the difference between the maximum value and the minimum value in a predetermined period (from impact to 0.1 sec). Note that having performed similar verification to the first to fifth indicators, this indicator was confirmed as being highly correlated with the impact point $D_{ts}$ in the up-down direction.

2-1-9. Amplitude of Angular Velocity $\omega_y$

A ninth indicator $C_{th9}=C_{ts9}$ according to the present embodiment is the amplitude of the angular velocity about the axis in the face-back direction, that is, $\omega_y$. In the present embodiment, this is the difference between the maximum value and the minimum value in a predetermined period (from impact to 0.1 sec). Note that having performed a similar verification to the first to fifth indicators, this indicator was confirmed as being highly correlated with the impact point $D_{th}$ in the left-right direction.

2-1-10. Amplitude of Angular Velocity $\omega_z$

A tenth indicator $C_{th10}=C_{ts10}$ according to the present embodiment is the amplitude of the angular velocity about the z-axis, that is, $\omega_z$. In the present embodiment, this is the difference between the maximum value and the minimum value in a predetermined period (from impact to 0.1 sec). Note that having performed similar verification to the first to fifth indicators, this indicator was confirmed as being highly correlated with the impact point $D_{th}$ in the left-right direction.

2-1-11. Head Speed $v_h$ at Time of Impact

An eleventh indicator $C_{th11}=C_{ts11}$ according to the present embodiment is a head velocity $V_h$ at the time of impact. The head velocity $v_h$ can be calculated as long as the data of the accelerations $a_x$, $a_y$ and $a_z$ and the angular velocities $\omega_x$, $\omega_y$ and $\omega_z$ is available, and since various calculation methods are known, detailed description is omitted here.

2-2. Verification

Hereinafter, the result of verifying the accuracy of the abovementioned impact point estimation processing will be described. The inventors made five golfers take test swings, using a golf club having an acceleration sensor and an angular velocity sensor attached to the end of the grip, similar to the abovementioned golf club 4. As a result, sensor data of acceleration and angular velocity corresponding to 441 swings/balls in total was acquired. Note that the sensor data referred to here was obtained with the impact points distributed over the entirety of the face surface. Data of the impact points $D_{th}$ and $D_{ts}$ (true values) that is specified with high accuracy by a system using a plurality of the abovementioned cameras was also acquired, in addition to the above sensor data.

Figure 15:
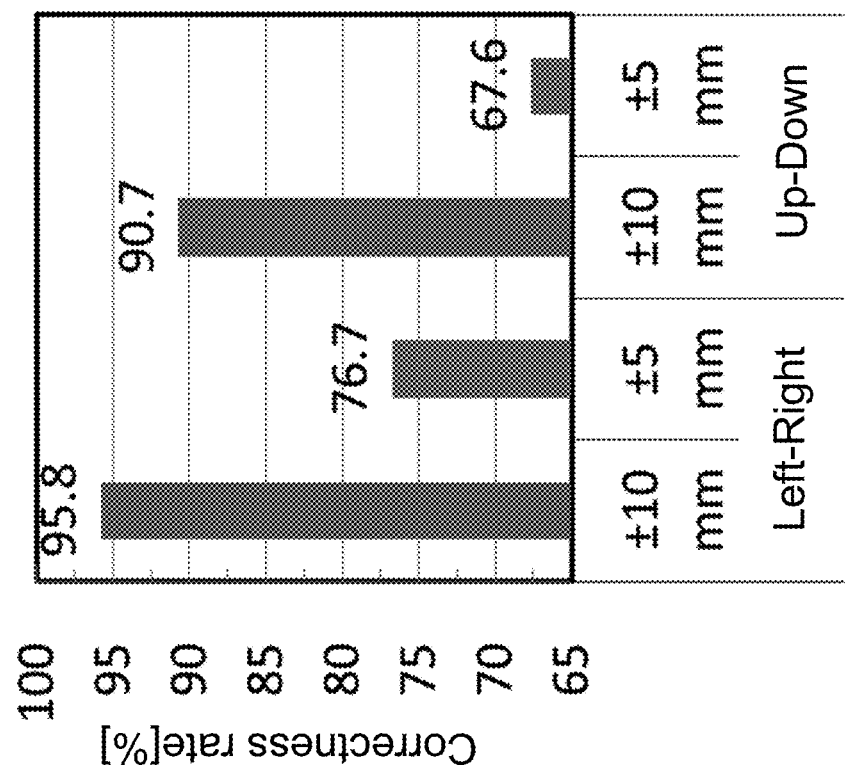
FIG. 15 is a graph (exemplary reference) showing the correctness rate of impact point estimation processing.

The impact points $D_{th}$ and $D_{ts}$ (test values) were estimated from the sensor data, in accordance with the flowchart shown in FIG. 5, apart from setting the phase angle φ2 that is used in step S7 to a uniform value (200 Hz) rather than changing according to flex, and omitting the exception processing of step S79. Furthermore, the test values and the true values of the impact points $D_{th}$ and $D_{ts}$ were compared, and the error was calculated. FIG. 15 is a graph showing correctness rates when the case where the error is in a range of ±10 mm and in a range of ±5 mm are set as being correct, with regard to both the impact point $D_{th}$ in the left-right direction and the impact point $D_{ts}$ in the up-down direction.

Figure 16:
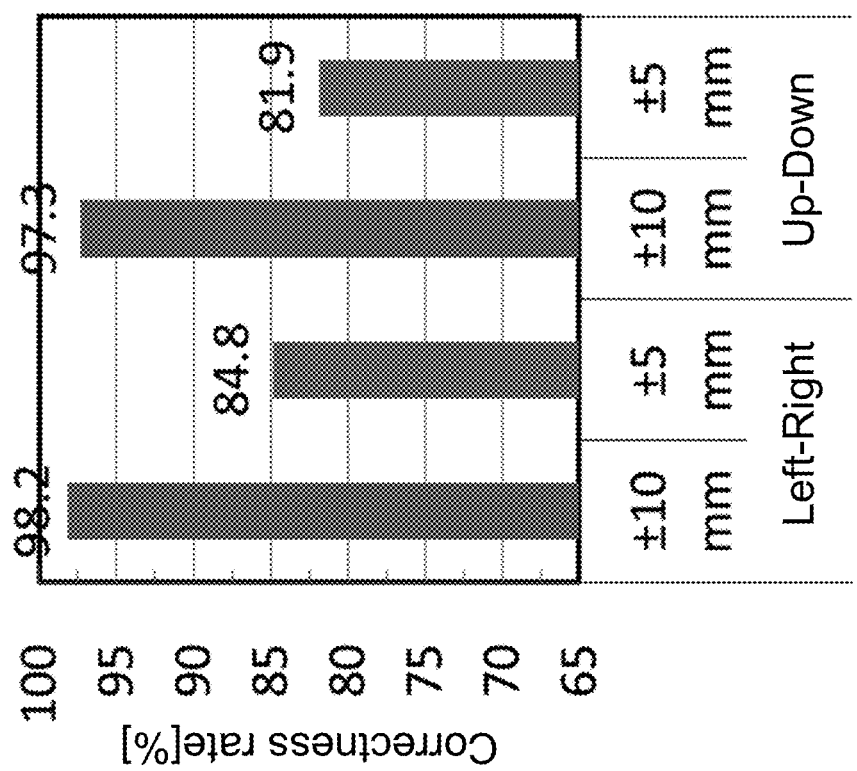
FIG. 16 is another graph (working example) showing the correctness rate of impact point estimation processing.

Also, the impact points $D_{th}$ and $D_{ts}$ (test values) were estimated, in accordance with a similar algorithm to the flowchart shown in FIG. 5. FIG. 16 is a graph showing results of calculating similar correctness rates to FIG. 15, using the test values obtained at this time. The results of FIGS. 15 and 16 confirmed the favorability of the exception processing and changing the indicator φ2 according to the characteristics of the shaft.

Figure 17:
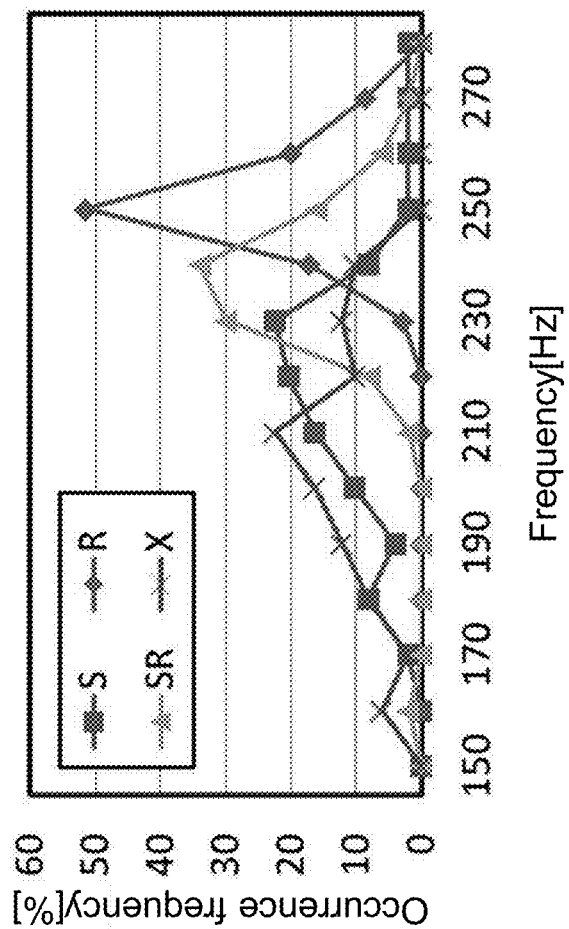
FIG. 17 is a graph showing the generation frequency of peak frequency in a fourth-order mode of the spectrum of angular velocity $\omega_x$ for every flex of the shaft.

Also, FIG. 17 is a graph showing the frequency with which the peak frequency of the fourth-order mode of the spectrum of the angular velocity $\omega_x$ occurs in the case of the above sensor data corresponding of 441 balls in total. In FIG. 17, a graph for each flex of the shaft is depicted. As is evident from the diagrams, the value of the peak frequency of the fourth-order mode of the spectrum of the angular velocity $\omega_x$ also differs when the flex differs. Accordingly, the significance of changing the frequency for determining the indicator φ2 for classifying the impact point in the up-down direction can be understood from FIG. 17.

3. Variations

Although one embodiment of the present invention was described above, the present invention is not limited to the above embodiment and various modifications can be made without departing from the spirit of the invention. For example, the following modifications can be made. Also, the gists of the following modifications can be combined as appropriate.

3-1

In the above embodiment, a multiple regression equation for deriving the impact points $D_{th}$ and $D_{ts}$ was prepared for each of the regions A1 to A8 in step S8. However, a different multiple regression equation from that one may be used at step S8 for classification by the characteristics of the shaft 40, in addition to classification by the regions A1 to A8. That is, sets of coefficients of multiple regression equations equal in number to the number of region classifications multiplied by the number of shaft characteristics, for example, will be prepared. In such a case, it is sufficient to execute multiple regression analysis for each new classification, in the testing performed in advance in order to determine the coefficient data 28, and to store the coefficient data obtained thereby in the storage part 23.

This modification can, for example, be implemented as follows. That is, in step S8, the impact point estimation part 24B selects a specific multiple regression equation corresponding to the flex input at step S2 and the region ultimately determined at step S7, from a large number of multiple regression equations stored in the storage part 23. The impact points $D_{th}$ and $D_{ts}$ are respectively then estimated, by substituting the indicators $C_{th1}, C_{th2}, \ldots, C_{thN}$ and $C_{ts1}, C_{ts2}, \ldots, C_{tsM}$ derived at step S6 into this specific multiple regression equation.

Also, a configuration can be adopted in which classification by the regions A1 to A8 is omitted, and the multiple regression equation that is used at step S8 is changed according to only the characteristics of the shaft 40.

As abovementioned, the influence of hitting the ball on the face surface 41a is transmitted from the head 41 through the shaft 40 to the sensor unit 1 that is attached to the grip 42. Accordingly, the waveform of the sensor data tends to be affected by the characteristics of the shaft 40. In this regard, in this modification, a multiple regression equation is defined for each type of shaft 40, and multiple regression equations are selected according to the characteristics of the shaft, thus allowing the accuracy of estimation of the impact point to be enhanced.

Note that the characteristics of the shaft 40 as referred to in this modification can also be classified according to torque, kick point and the like, in addition to the abovementioned flex. Naturally, classification can be performed with only torque or only kick point, or classification can also be performed with a suitable combination of flex, torque and kick point. Torque is an indicator representing the twisting tendency (torsional rigidity) of the shaft 40. Kick point is an indicator representing the bend (low rigidity) point of the shaft 40, and the types of kick point include low kick point, high kick point and mid kick point. Low kick point means that rigidity is relatively low on the tip side (head side) of the shaft 40, high kick point means that rigidity is relatively low on the butt side (grip side), and mid kick point means that rigidity is relatively low in a vicinity of the middle.

3-2

The indicators $C_{th}$ and $C_{ts}$ for deriving the impact points $D_{th}$ and $D_{ts}$ are not limited to the above example, and can be suitable indicators that are dependent on the impact points $D_{th}$ and $D_{ts}$ (preferably, having a large correlation with the impact points $D_{th}$ and $D_{ts}$). Also, for example, the indicators of following indicators (1) to (5) can also be applied as indicators for estimation of the impact points $D_{th}$ and $D_{ts}$.

(1) The peak amplitude of the first-order mode of the spectra of $\omega_x$ and $a_y$ (particularly suitable for estimating the impact point $D_{ts}$ in the up-down direction).

(2) The peak amplitude of the second-order mode of the spectrum of $\omega_y$ (particularly suitable for estimating the impact point $D_{ts}$ in the up-down direction).

(3) The maximum value of $\omega_x$ immediately after impact (particularly suitable for estimating the impact point $D_{ts}$ in the up-down direction).

(4) At least one of the peak amplitude and the phase angle of a high-frequency mode (e.g., third or fourth-order mode) of the spectra of $\omega_x$ and $a_y$ (particularly suitable for estimating the impact point $D_{ts}$ in the up-down direction).

(5) At least one of the peak amplitude and the phase angle of a high-frequency mode (e.g., third or fourth-order mode) of the spectrum of $\omega_z$ (particularly suitable for estimating the impact point $D_{th}$ in the left-right direction).

3-3

In the above embodiment, the sensor unit 1 having two sensors, namely, the acceleration sensor 11 and the angular velocity sensor 12, was used, but the sensor unit 1 can be configured differently. For example, in the case of estimating the impact point from only the data of angular velocity, the acceleration sensor 11 can be omitted, and conversely, in the case of estimating the impact point from only the data of acceleration, the angular velocity sensor 12 can also be omitted.

3-4

The sensor unit 1 is not limited to being attached to the grip 42, and may be attached to the shaft 40.

3-5

Although, in the above embodiment, a multiple regression equation was used as a regression equation for deriving the impact point, a single regression equation can also be used. Also, a nonlinear regression equation may be used rather than a linear regression equation. To evaluate the nonlinearity of the relationship between the impact point and an indicator, the following methods can be used, for example.
(1) Provide an Nth power explanatory variables (N≥2) or interaction terms in the regression equation.
(2) Build machine learning (neural network).
3-6

In the above embodiment, the local coordinate system of the sensor unit 1 was set as shown in FIG. 3, but can be freely set. Also, the axes for defining the coordinates of the impact point are not limited to the $D_{th}$ axis and the $D_{ts}$ axis, and can be freely set. For example, the principal axis of inertia on the face surface 41a can be set as a first axis, and the axis that intersects the first axis perpendicularly can be set as a second axis. The position of the impact point can, for example, also be specified with regions such as the regions A1 to A8, rather than coordinates.

REFERENCE SIGNS LIST

1 Sensor unit
11 Acceleration sensor
12 Angular velocity sensor
2 Impact point estimation apparatus (computer)
24A Data acquisition part (acquisition part)
24B Impact point estimation part (estimation part)
3 Impact point estimation program
4 Golf club
40 Shaft
41 Head
41a Face surface
42 Grip

The invention claimed is:

1. A system, comprising:
an impact point estimation computer comprising a processor and a non-transitory computer readable storage device storing computer executable program code;
a golf club having a grip, a shaft and a head;
a golf ball; and
a sensing device,
the impact point estimation computer being used with the golf club and the golf ball, the impact point estimation computer being connected to the sensing device, the sensing device including at least one of an angular velocity sensor and an acceleration sensor attached to at least one of the grip and the shaft, the impact point estimation computer configured to estimate, when the golf club is swung and hits the golf ball, an impact point, the impact point being a position at which impact with the golf ball occurs on a face surface of the head, and the computer executable program code causing the processor to execute:
acquiring time-series sensor data that is output from the sensing device; and
estimating the impact point, according to a shaft characteristic which is a characteristic of the shaft, based on the sensor data,
wherein the estimating the impact point includes:
determining a specific frequency, according to a flex of the shaft, which is included in the shaft characteristic,
deriving a phase angle corresponding to the specific frequency of a spectrum of an angular velocity about an axis in a toe-heel direction or in a direction roughly parallel to the toe-heel direction, or a phase angle corresponding to the specific frequency of a spectrum of an acceleration in a face-back direction or a direction roughly parallel to the face-back direction, and estimating a position of the impact point in an up-down direction, according to the phase angle.

2. The system according to claim 1, wherein the estimating the impact point includes deriving an indicator that is dependent on the impact point from the sensor data, according to the shaft characteristic, and estimating the impact point, according to the indicator.

3. The system according to claim 2, wherein the estimating the impact point includes determining a specific frequency, according to the shaft characteristic, deriving, as the indicator, a phase angle corresponding to the specific frequency of a spectrum of an angular velocity about an axis in a toe-heel direction or in a direction roughly parallel to the toe-heel direction, or a phase angle corresponding to the specific frequency of a spectrum of an acceleration in a face-back direction or a direction roughly parallel to the face-back direction, and estimating a position of the impact point in an up-down direction, according to the phase angle.

4. The system according to claim 1, wherein the shaft characteristic is flex.

5. The system according to claim 2, wherein the shaft characteristic is flex.

6. The system according to claim 3, wherein the shaft characteristic is flex.

7. The system according to claim 1, wherein the estimating the impact point includes deriving an indicator that is dependent on the impact point from the sensor data, and estimating the impact point, according to the indicator and the shaft characteristic.

8. The system according to claim 7, wherein the estimating the impact point includes estimating the impact point by selecting a specific regression equation, according to the shaft characteristic, from among a plurality of regression equations in which the indicator is an explanatory variable and the impact point is an objective variable, and substituting the indicator derived from the sensor data into the specific regression equation.

9. The system according to claim 7, wherein the shaft characteristic is at least one of flex, torque, kick point, and weight.

10. The system according to claim 8, wherein the shaft characteristic is at least one of flex, torque, kick point, and weight.

11. A system, comprising:
an impact point estimation computer comprising a processor and a non-transitory computer readable storage device storing computer executable program code;
a golf club having a grip, a shaft and a head;
a golf ball; and
a sensing device,
the impact point estimation computer being used with the golf club and the golf ball, the impact point estimation computer being connected to the sensing device, the sensing device including at least one of an angular velocity sensor and an acceleration sensor attached to at least one of the grip and the shaft, the impact point estimation computer configured to estimate, when the golf club is swung and hits the golf ball, an impact point, the impact point being a position at which impact with the golf ball occurs on a face surface of the head, and the computer executable program code causing the processor to execute:
acquiring time-series sensor data that is output from the sensing device; and estimating the impact point, based on the sensor data,
wherein the estimating includes determining whether the impact point exists on the face surface in a vicinity of a principal axis of inertia, based on the sensor data,
wherein the estimating includes deriving an indicator that is dependent on the impact point from the sensor data, and determining whether the impact point exists on the face surface in a vicinity of the principal axis of inertia, according to the indicator, and
wherein the estimating includes deriving, as the indicator, a magnitude of a spectrum corresponding to a predetermined mode or a predetermined frequency of an angular velocity about an axis in a toe-heel direction or in a direction that is roughly parallel to the toe-heel direction, or a magnitude of a spectrum corresponding to a predetermined mode or a predetermined frequency of an acceleration in a face-back direction or in a direction roughly parallel to the face-back direction, and determining whether the impact point exists on the face surface in a vicinity of the principal axis of inertia, according to the magnitude of the spectrum.

12. A system, comprising:
an impact point estimation computer comprising a processor and a non-transitory computer readable storage device storing computer executable program code;
a golf club heaving a grip, a shaft and a head;
a golf ball; and
a sensing device,
the impact point estimation computer being used with the golf club and the golf ball, the impact point estimation computer being connected to the sensing device, the sensing device including at least one of an angular velocity sensor and an acceleration sensor attached to at least one of the grip and the shaft, the impact point estimation computer configured to estimate, when the golf club is swung and hits the golf ball, an impact point, the impact point being a position at which impact with the golf ball occurs on a face surface of the head, and the computer executable program code causing the processor to execute:
acquiring time-series sensor data that is output from the sensing device; and
estimating the impact point, based on the sensor data,
wherein the estimating includes classifying the impact point into one of a plurality of regions defined on the face surface, according to a first indicator that is derived from the sensor data, and, in a case where a second indicator that is derived from the sensor data exceeds a threshold, reclassifying the impact point into another region included among the plurality of regions.

13. A system, comprising:
an impact point estimation computer comprising a processor and a non-transitory computer readable storage device storing computer executable program code;
a golf club having a grip, a shaft and a head;
a golf ball; and
a sensing device,
the impact point estimation computer being used with the golf club and the golf ball, the impact point estimation computer being connected to the sensing device, the sensing device including at least one of an angular velocity sensor and an acceleration sensor attached to at least one of the grip and the shaft, the impact point estimation computer configured to estimate, when the golf club is swung and hits the golf ball, an impact point, the impact point being a position at which impact with the golf ball occurs on a face surface of the head, and the computer executable program code causing the processor to execute:
acquiring time-series sensor data that is output from the sensing device; and
estimating the impact point, according to a shaft characteristic which is a characteristic of the shaft, based on the sensor data,
wherein the estimating the impact point includes:
deriving an indicator that is dependent on the impact point from the sensor data,
selecting a specific regression equation, according to at least one of flex, torque, kick point and weight of the shaft, from among a plurality of regression equations in which the indicator is an explanatory variable and the impact point is an objective variable, and
substituting the indicator derived from the sensor data into the specific regression equation to estimate the impact point.

* * * * *